United States Patent
Zhu

(10) Patent No.: US 7,333,890 B2
(45) Date of Patent: Feb. 19, 2008

(54) CHINESE LUNAR CALENDAR-BASED TIDAL PREDICTION SYSTEM AND METHOD THEREOF

(75) Inventor: Chunbao Zhu, Singapore (SG)

(73) Assignee: Nanyang Polytechnic, Singapore (SG)

( * ) Notice: Subject to any disclaimer, the term of this patent is extended or adjusted under 35 U.S.C. 154(b) by 123 days.

(21) Appl. No.: 11/212,573

(22) Filed: Aug. 29, 2005

(65) Prior Publication Data

US 2006/0224323 A1 Oct. 5, 2006

(30) Foreign Application Priority Data

Mar. 30, 2005 (SG) .............................. 200502018-5

(51) Int. Cl.
*G06F 17/00* (2006.01)
*G06F 17/10* (2006.01)

(52) U.S. Cl. ................................. 702/2; 368/19; 702/1
(58) Field of Classification Search ................. 368/19; 702/1, 2

See application file for complete search history.

(56) References Cited

U.S. PATENT DOCUMENTS

| | | | | |
|---|---|---|---|---|
| 2,677,928 A | * | 5/1954 | Haynes | 368/19 |
| 3,524,313 A | * | 8/1970 | Wood | 368/19 |
| 4,272,107 A | * | 6/1981 | Elbow | 283/115 |
| 5,293,355 A | * | 3/1994 | Widen et al. | 368/19 |
| 5,299,126 A | * | 3/1994 | Spraker | 368/19 |
| 5,347,497 A | * | 9/1994 | Allen | 368/19 |

(Continued)

FOREIGN PATENT DOCUMENTS

FR 2229095 * 1/1975

(Continued)

*Primary Examiner*—Edward R Cosimano
(74) *Attorney, Agent, or Firm*—Lawrence Y D Ho & Associates

(57) ABSTRACT

The present invention provides a Chinese lunar calendar-based tidal prediction system and method that generate tidal predictions using empirical prediction models, wherein the empirical prediction models are generated using Genetic Algorithms-based regression analysis for a given set of observed tidal data collected at a water level station during a period of one year which is referred as reference year. In one aspect of the present invention, there is provided a tidal prediction system comprising an electronic device having a memory capacity as a storage medium for storing input, intermediate, and output information, and a processing capacity for executing embedded programs; a regression model creator program; and a tidal height predictor program; wherein both of programs are implemented in the electronic device. In another aspect of the present invention, there is provided a Chinese lunar calendar-based tidal prediction method comprising the steps of inputting a prediction date of which the tidal prediction is requested for a location; selecting a reference year from which the tidal prediction for the prediction date will be made; obtaining actual tidal data in the reference year near the location, wherein the actual tidal data is formatted according to Chinese lunar calendar; generating a regression prediction model for the actual tidal data of the reference year by performing genetic algorithm evolution of the actual tidal data; and predicting the tidal heights for the requested prediction date in accordance with the regression prediction model.

20 Claims, 16 Drawing Sheets

U.S. PATENT DOCUMENTS

| | | | | |
|---|---|---|---|---|
| 5,363,307 A | * | 11/1994 | Yoshida | 701/219 |
| 5,475,655 A | * | 12/1995 | Kerr | 368/19 |
| 5,579,289 A | * | 11/1996 | Kerr | 368/19 |
| 5,731,573 A | * | 3/1998 | Allen et al. | 235/78 R |
| 6,226,594 B1 | * | 5/2001 | Nakamura | 702/5 |
| 2003/0167124 A1 | * | 9/2003 | Bowden | 702/2 |
| 2006/0224323 A1 | * | 10/2006 | Zhu | 702/2 |

FOREIGN PATENT DOCUMENTS

| | | | |
|---|---|---|---|
| FR | 2 654 850 A1 | * | 5/1991 |
| JP | 6-308257 A | * | 11/1994 |
| JP | 2003-315468 A | * | 11/2003 |

* cited by examiner

| 4699 | 05/02/2000 | 1 | 30 | 2 | 30 | 3 | 29 | 4 | 29 | 5 | 30 | 6 | 29 | 7 | 29 | 8 | 30 | 9 | 29 | 10 | 30 | 11 | 30 | 12 | 29 | | |
|---|---|---|---|---|---|---|---|---|---|---|---|---|---|---|---|---|---|---|---|---|---|---|---|---|---|---|---|
| 4700 2001 | 24/01/2001 | 1 | 30 | 2 | 30 | 3 | 29 | 4 | 30 | 5 | 29 | 6 | 30 | 7 | 29 | 8 | 30 | 9 | 30 | 10 | 29 | 11 | 30 | 12 | 29 | | |
| 4701 2002 | 12/02/2002 | 1 | 30 | 2 | 30 | 3 | 29 | 4 | 30 | 6 | 30 | 6 | 30 | 7 | 29 | 8 | 29 | 9 | 30 | 10 | 29 | 11 | 30 | 12 | 29 | | |
| 4702 2003 | 01/02/2003 | 1 | 30 | 2 | 30 | 3 | 29 | 4 | 30 | 5 | 29 | 6 | 29 | 7 | 30 | 8 | 29 | 9 | 29 | 10 | 30 | 11 | 29 | 12 | 30 | | |
| 4703 2004 | 22/01/2004 | 1 | 29 | 2 | 30 | 3 | 29 | 4 | 30 | 5 | 30 | 6 | 30 | 7 | 29 | 8 | 29 | 9 | 30 | 10 | 30 | 11 | 29 | 12 | 30 | | |
| 4704 2005 | 09/02/2005 | 1 | 29 | 2 | 30 | 3 | 29 | 4 | 30 | 5 | 29 | 6 | 30 | 7 | 30 | 8 | 28 | 9 | 30 | 10 | 29 | 11 | 30 | 12 | 29 | | |

| 4777 2078 | 12/02/2078 | 1 | 30 | 2 | 29 | 3 | 30 | 4 | 29 | 5 | 29 | 6 | 30 | 7 | 30 | 8 | 30 | 9 | 30 | 10 | 29 | 11 | 30 | 12 | 30 | | |
|---|---|---|---|---|---|---|---|---|---|---|---|---|---|---|---|---|---|---|---|---|---|---|---|---|---|---|---|
| 4778 2079 | 02/02/2079 | 1 | 29 | 2 | 30 | 3 | 29 | 4 | 30 | 5 | 29 | 6 | 29 | 7 | 30 | 8 | 29 | 9 | 29 | 10 | 30 | 11 | 30 | 12 | 30 | | |
| 4779 2080 | 22/02/2080 | 1 | 30 | 2 | 29 | 3 | 29 | 4 | 29 | 5 | 29 | 6 | 29 | 7 | 29 | 8 | 29 | 9 | 29 | 10 | 29 | 11 | 30 | 12 | 30 | | |

FIG. 3

CHINESE LUNAR CALENDAR-BASED TIDAL PREDICTION SYSTEM AND METHOD THEREOF

FIELD OF THE INVENTION

The present invention generally relates to technologies of tidal prediction, and more particularly to a system and method for tidal height prediction utilizing Chinese lunar calendar and Genetic Algorithms.

BACKGROUND OF THE INVENTION

Tides are the regular fluctuations in the mean sea level that are caused by the gravitational attractions of the Moon and Sun. Tides are usually the mean tidal height denoting the relatively short-period, astronomically induced vertical changes in the sea surface (exclusive of wind-induced waves and earthquake-caused tsunami). Another useful term is tidal current that refers to accompanying periodic horizontal movement of the ocean water.

Tides are influenced by many factors including astronomical, non-astronomical, or random ones. The astronomical factors include two types of forces responsible for producing tides. One is the force of gravitation exerted by the Moon and Sun upon the Earth. The other is the centrifugal force produced by the revolution of the Earth and Moon (and the Earth and Sun) around their common center-of-mass.

The net effect exerted by the Moon and Sun on the Earth depends upon their relative positions. One way to describe the relative positions of the Earth, Sun, and Moon is using the phases of the Moon. The Sun always illuminates one half of the Moon facing the Sun, except for lunar eclipses. When the Sun and Moon are on opposite sides of the Earth, the Moon appears "full" to us. When the Moon is between the Earth and Sun, it appears dark, a "new" Moon. In between, the Moon's illuminated surface appears to grow from a new Moon to a full Moon, and then decreases to the next new Moon. When the Moon is at new or full phases, the gravitational attractions of the Moon and Sun synergistically induce greater-than-average tides, known as spring tides. When the Moon is at first or third quarter phases, the gravitational attractions of the Moon and Sun partially counteract each other so as to induce high tides that are lower than average and low tides that are higher than average. Such tides with diminished range are called neap tides.

The non-astronomical factors such as configuration of the coastline, local depth of the water, ocean-floor topography, and other hydrographic and meteorological influences may play an important role in altering the range, the interval between high and low water, and the times of arrival of the tides. For example, friction between the water and ocean floor slows the movement of the tides; land masses impose a barrier to the progress of tidal water; and topography on the ocean floor provides a restriction to the forward movement of tidal water. All these factors may delay arrivals of tides for up to 3.5 hours.

Unpredictable random factors may have significant effects on the tides. Such factors include flood, winds, rain, freshwater runoff, and other short-term meteorological events. For example, earthquakes may generate tsunami, generating tidal waves that are much higher than normal regular tides.

Information of tidal heights and their arrival times is critically important for a variety of activities including navigation through inter-coastal waterways and within estuaries, bays, and harbors; harbor engineering projects; cruise and container terminal berth allocation and scheduling; provision of information necessary for underwater demolition activities and other military engineering uses; fishery; water-related sport activities; and utilization of hydro-dams as energy generators. Therefore, tidal prediction is of great practical significance.

A considerable amount of effort has been made for tidal prediction so far. Many methods and devices have been proposed for tidal prediction and tidal information display. For example, U.S. Pat. No. 6,226,594 discloses a method and device for calculating a spring tide day. The spring tide day is useful for certain industries, however, it does not predict the daily and hourly tidal height values which are useful for other industries and recreations.

Currently, to make tidal predictions which closely approximate the National Oceanic and Atmospheric Administration (NOAA) predictions one must use the "Harmonic Analysis" method as described in the "Manual Of Harmonic Analysis and Prediction of Tides", Special Publication No. 98 published by the U.S. Department of Commerce, described in US published patent application US 2003/0167124 A1, [0005]. Since tides are generated essentially by astronomical forces of harmonic nature, it is no surprise that the harmonic analysis is the principal method used in tidal study and prediction.

The harmonic analysis of tides is based upon an assumption that the rise and fall of the tides in any locality can be expressed mathematically by the sum of a series of harmonic terms having certain relations to astronomical conditions. From Special Publication 98 (paragraph 8) "Harmonic Analysis" as applied to tides is the process by which the observed tidal data at any place are separated into a number of harmonic constituents. The quantities sought are known as harmonic constants consisting of amplitudes and phases. Harmonic prediction is accomplished by reuniting the elementary constituents in accordance with astronomical relations prevailing at the time for which the predictions are made.

"Harmonic Analysis" method to predict tidal times and heights for any given locality is complex and labor intensive. It requires tidal observations at one water station over a long period of time, typically 18.6 years. In addition, it requires the use of harmonic constraints and a control file for each location for which the tidal predictions are to be generated. Furthermore, the existing tidal prediction systems are very large and complex. It is not possible to integrate such systems into other IT systems such as cruise and container berth allocation systems that require timely tidal prediction. As a result, the existing tidal prediction systems are not readily available for wide range of industrial applications for real-time tidal predictions. Finally, the prediction accuracy achieved by the existing tidal prediction systems varies in a significantly large range with correctness of specification of numerous parameters including astronomical and non-astronomical ones, as well as local control parameters. If these complex parameters are not defined precisely, which is difficult even for professionals, the tidal prediction accuracy can be miserably low and unacceptable.

Therefore there is an existing need of a tidal prediction system and method that is simple, easy to use, portable, and world-wide applicable. Furthermore, the system and method can provide real-time tidal predictions with sufficient prediction accuracy for various industrial applications. This invention satisfies this need. Other advantages of this invention will be apparent with reference to the detailed description.

SUMMARY OF THE INVENTION

The present invention provides a Chinese lunar calendar-based tidal prediction system and method that generate tidal predictions using empirical prediction models, wherein the empirical prediction models are generated using Genetic Algorithms-based regression analysis for a given set of observed tidal data collected at a water level station during a period of one year which is referred as reference year.

In one aspect of the present invention, there is provided a tidal prediction system comprising an electronic device having a memory capacity as a storage medium for storing input, intermediate, and output information, and a processing capacity for executing embedded programs; a regression model creator program; and a tidal height predictor program; wherein both of programs are implemented in the electronic device. In one embodiment, the regression model creator program comprises a Genetic Algorithms (GA)-based regression analyzer program and a model parameter editor program, wherein the GA-based regression analyzer program is adapted to perform genetic algorithm evolution to search for optimal model parameters that would best fit the given set of the actual tidal data.

In another aspect of the present invention, there is provided a Chinese lunar calendar-based tidal prediction method comprising the steps of inputting a prediction date of which the tidal prediction is requested for a location; selecting a reference year from which the tidal prediction for the prediction date will be made; obtaining actual tidal data in the reference year near the location, wherein the actual tidal data is formatted according to Chinese lunar calendar; generating a regression prediction model for the actual tidal data of the reference year by performing genetic algorithm evolution of the actual tidal data; and predicting the tidal heights for the requested prediction date in accordance with the regression prediction model.

One advantage of the present invention is that the system and method do not require any astronomical knowledge, tidal-producing forces, complex harmonic constraints, or non-astronomical and local control parameter input at all.

Another advantage of the present invention is that the system and method are able to provide tidal predictions with sufficient accuracy.

Yet another advantage of the present invention is that a tidal prediction in meters can be made for any time, at interval of one minute, on any Gregorian calendar date.

Yet another advantage of the present invention is that the system and method can be applied to any water level station of the world as long as actual tidal observations are available for generating the prediction models using the GA-based regression analyzer program.

Yet another advantage of the present invention is that the system is portable and can be easily integrated with any other IT systems that need real-time tidal prediction support.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

FIG. 3 is an exemplary data representation of the Chinese lunar calendar used for date conversion between the Gregorian calendar dates and the Chinese lunar calendar dates.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention provides a Chinese lunar calendar-based tidal prediction system and method that generate tidal predictions using empirical prediction models, wherein the empirical prediction models are generated using Genetic Algorithms-based regression analysis for a given set of observed tidal data collected at a water level station during a period of one year which is referred as reference year. It is to be appreciated that specific configurations of the system and specific steps of the method in the following detailed description are for the sole purpose of illustration of the principles of the present invention. Other applicable variations are conceivable to those skilled in the arts. Furthermore, those details known to those skilled in the arts are not repeated herein for the sake of brevity and simplicity.

Figure 1:
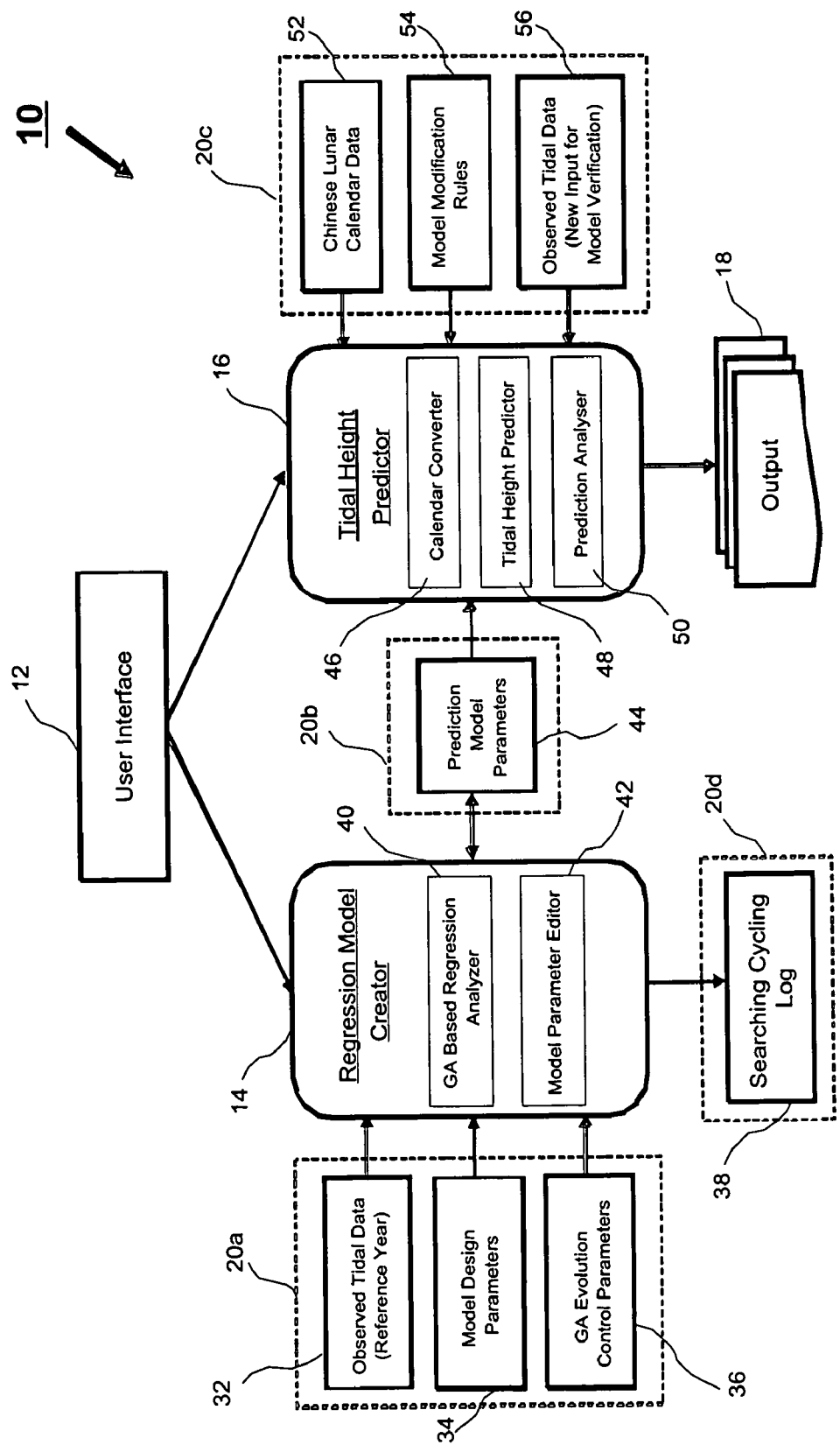
FIG. 1 is a functional block diagram of a tidal prediction system in accordance with one embodiment of the present invention.

Now referring to FIG. 1, there is provided a functional block diagram of the tidal prediction system in accordance with one embodiment of the present invention. The tidal prediction system 10 comprises a user interface 12; an electronic device having a memory capacity as storage media 20a, 20b, 20c, 20d for storing input, intermediate, and output information, and a processing capacity for executing embedded programs; and computing programs. The user interface 12 can be any available devices that may be electronically connected to the electronic device either through cable or wireless, and that enable a user to input into the electronic device the information for practicing the tidal prediction method of the present invention, and receive and display the output 18 of the tidal prediction. The information includes original data such as observed tidal data, parameters for establishing the empirical regression models, and other information to be inputted by the user for carrying out the calculations required by the method. The information is stored in the storage media of the electronic device.

The electronic device may be any computing device such as PCs, notebooks, PDAs, and computers. The electronic device applicable for the present invention is not limited to any type of computing devices as long as the device has electronic memory for storing electronic information and processing capacity for executing embedded computer programs. As shown in FIG. 1, the electronic device has the storage medium 20a, 20b, 20c, 20d, wherein the different parts are stored therein with different data. For example, the storage medium 20a stores the observed tidal data 32, model design parameters 34, and GA evolution control parameters 36. The observed tidal data 32 refers to the actual tidal height readings, either regularly or irregularly taken at a reference station during a period of one year. The year during which the real-time tidal data were recorded using a water gage, is called reference year thereafter. The shown relations between the stored data and the computer programs are for illustrative purpose only.

The computer programs comprise a Genetic Algorithms (GA)-based regression model creator program 14 and a tidal height predictor program 16. The GA-based regression model creator program 14 further comprises a GA-based regression analyzer program 40 and a model parameter editor program 42. The GA based regression analyzer program 40 is a GA-based artificial intelligence (AI) program that receives the observed tidal data 32, model design parameters 34, and GA evolution control parameters 36 from the storage medium 20a, and performs GA evolution cycles to search for the optimal regression parameters that best fit the observed tidal data. The prediction model parameters 44 searched thus will be stored in the storage medium 20b. The prediction model parameters 44 may be manually edited by the end user using the module parameter editor program 42 via the user interface 12. In addition, the GA-based regression parameter searching process is recorded into a log file 38 in the storage medium 20d, therefore, the searching results can be compared with various settings of GA evolution control parameters 36, and thus the optimal evolution control parameters can be obtained.

The tidal height predictor program 16 further comprises a calendar converter program 46, a tidal height predictor program 48, and a prediction analyzer program 50. When the user makes a request via interface 12 for a tidal prediction at time $t_p$ on date$_G$ (the date$_G$ is normally in Gregorian calendar commonly used today), the calendar converter program 46 converts the date$_G$ into a corresponding Chinese calendar date, date$_C$ using Chinese Lunar Calendar Data 52 stored in storage medium 20c. And then the tidal height predictor program 48 will use the Chinese calendar date, date$_C$, as the key to retrieve a correct set of model parameters to compute the tidal height at time $t_p$. The tidal height predictor program 48 may also present the predicted tidal curve either in text form or in graphics mode, or transfer the output to other IT system. The predicted tidal data can be compared by the prediction analyzer program 50 with available actual tidal measurements 56 that are stored in the storage medium 20c. The model modification rules 54 also stored in the storage medium 20c may be modified in order to improve the tidal prediction accuracy, details of which will be described hereinafter.

As mentioned above, the Moon and Sun are the main astronomical sources affecting tides. Although the Moon has 2.25 times more gravitational attractions on the tide than does the Sun, the gravitational attraction from the Sun could not be ignored. The tides are generated by the net effect exerted by the Moon and Sun on the Earth, wherein the net effect depends upon their relative positions among the Moon, Sun and Earth. It is evident that any prediction method must take into the consideration of the relative positions among the Moon, Sun, and Earth.

Figure 2:
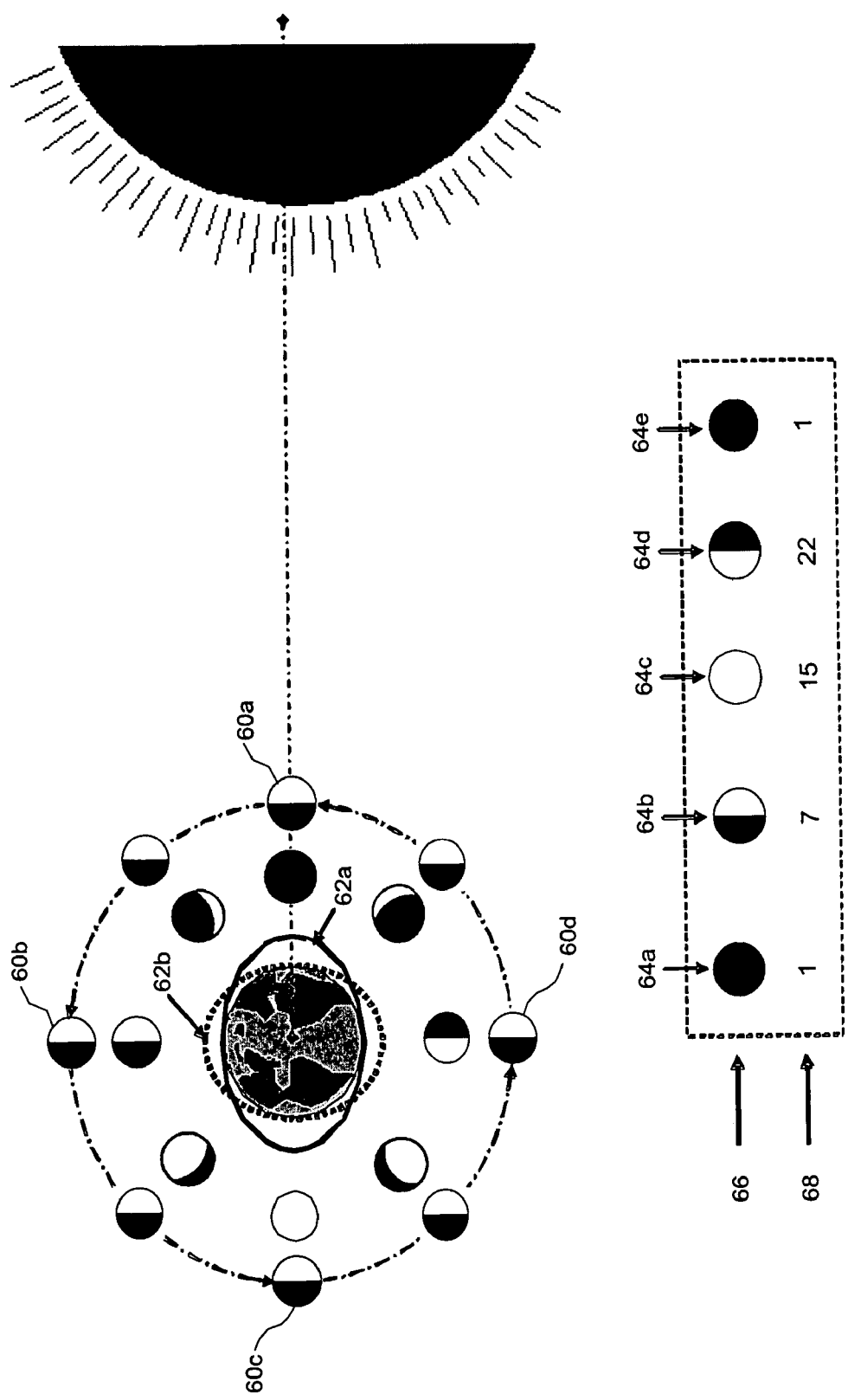
FIG. 2 illustrates the various Moon phases and the relations between the Moon phases and Chinese lunar calendar dates.

As can be seen from FIG. 2, the Sun always illuminates the half of the Moon facing the Sun (except for lunar eclipses when the Moon passes through the Earth's shadow). The lunar phases are the appearances of the Moon observed from the Earth's surface. The appearance of the Moon observed from the Earth's surface changes over a cyclic period that repeats itself once every approximately 29.5 earth days.

Referring to FIG. 2, when the Moon 60a is between the Earth and the Sun, it appears dark, "new Moon" 64a. When the Sun and Moon 60c are on opposite sides of the Earth, the Moon appears "full" to us, "full Moon" 64c. In between, the Moon's illuminated surface appears to grow to full 64c, and then decreases to the next new moon 64e. For example, when the Moon is at position 60b, we see half of the Moon that is lit up, a first quarter moon 64b; when the Moon is at position 60d, half of the Moon is lit up too, but we see a third quarter moon 64d. When the Moon is at new phase and full phase, the spring tides 62a are generated. At the first and third quarter phases (quadrature) of the Moon, the neap tides 62b are observed. Since the lunar phases 66 are caused by the relative positions of the Sun, Earth, and Moon, it is reasonable to use the lunar phases observed to estimate the relative positions of the Sun, Earth, and Moon, and therefore to predict the range and type of the tides generated.

Referring still to FIG. 2, it is shown that the lunar phases 66 are closely related to Chinese lunar calendar dates 68. For example, there is always a new Moon 64a on the first day of every Chinese lunar month and a full Moon 64c on the 15$^{th}$ day of a Chinese lunar month. Similarly, a first quarter Moon 64b is on the 7$^{th}$ day of any lunar month, and a third quarter Moon 64d on the 22$^{nd}$ day and repeatedly next new Moon 64e on the first day of next lunar month.

Referring now to FIG. 3, the traditional Chinese agricultural (lunar) calendar is primarily lunar, in that the lunar cycle (a lunation) between new Moons is a principal part of the calendar. A Chinese calendar year normally consists of 12 months where a month corresponds to one lunar cycle. Each month starts on the day of the new moon. Since the cycle is not an even number of days (a lunar cycle averages 29.53 days), a month in Chinese lunar calendar can vary between 29 and 30 days and a normal year can be 353, 354, or 355 days.

Chinese lunar calendar currently is defined by Zijinshan Observatory (Purple Mountain Observatory) at Nanjing, China. The currently available calendar data are for the period from 1901 to 2080. FIG. 3 shows the Chinese calendar data table 70 designed for calendar conversion and tidal prediction purposes of the present invention. The table 70 contains sufficient Chinese calendar information, such as years 90, months 78, and number of days 80 in every lunar month. For example, in Chinese lunar year 4700, there are 30 days in the 12$^{th}$ month 84. For every Chinese lunar year, say 4699 72, a corresponding Gregorian year 2000 74, is indicated in the table 70. For easy converting Gregorian calendar to Chinese lunar calendar, start day of each Chinese lunar year 92 (Chinese New Year—CNY) is stored as well. For example, the CNY of Chinese Year 4704 (Gregorian calendar year 2005, 86) is Sep. 02, 2005 88. It is noted that although the calendar table 70 in FIG. 3 contains Chinese lunar calendar information from Year 1901 (not shown in the table) to 2080, more calendar data can be added to the table via the user interface 12 in FIG. 1.

The Chinese lunar calendar is not a pure lunar calendar, but is actually embedded with accurate information of the relations among the Moon, Sun, and Earth. As a matter of fact, Chinese lunar calendar is also partially solar because 7 times in a 19-year cycle, an extra leap month (runyue) is being added to each of the seven lunar years to bring lunar years back into line with the longer solar years; this is why Chinese lunar calendar is sometimes called a lunisolar calendar. In FIG. 3, a leap month with its previous month is marked in bold, for example, in Chinese year 4700, the 4$^{th}$ month 76 is a leap month that is added to Chinese lunar year 4700 such that the leap year (4700) has 13 months, as can be seen from the month row 82 of Chinese Year 4700 in FIG. 3.

The calendar converter program 46 in FIG. 1 reads into memory the Chinese calendar information table 70, and constructs an array of date objects; each of the date objects containing detailed calendar conversion information. For example, one date object date$_{Ck}$ may have Chinese lunar calendar date information such as Chinese lunar year Y$_{Ck}$, lunar month M$_{Ck}$, lunar day d$_{Ck}$, and corresponding Gregorian calendar date information such as Gregorian calendar year Y$_{Gk}$, month m$_{Gk}$, and day d$_{Gk}$; where k=1 to N$_{DOB}$, while N$_{DOB}$ is the number of elements (date objects) in the array of date objects, in the system, N$_{DOB}$ is set to 1200. Upon a date conversion request, an array of date objects is dynamically constructed, and a pointer is used to search for the given Gregorian date and thereafter to output a corresponding Chinese lunar calendar date, and vice versa.

Figure 4:
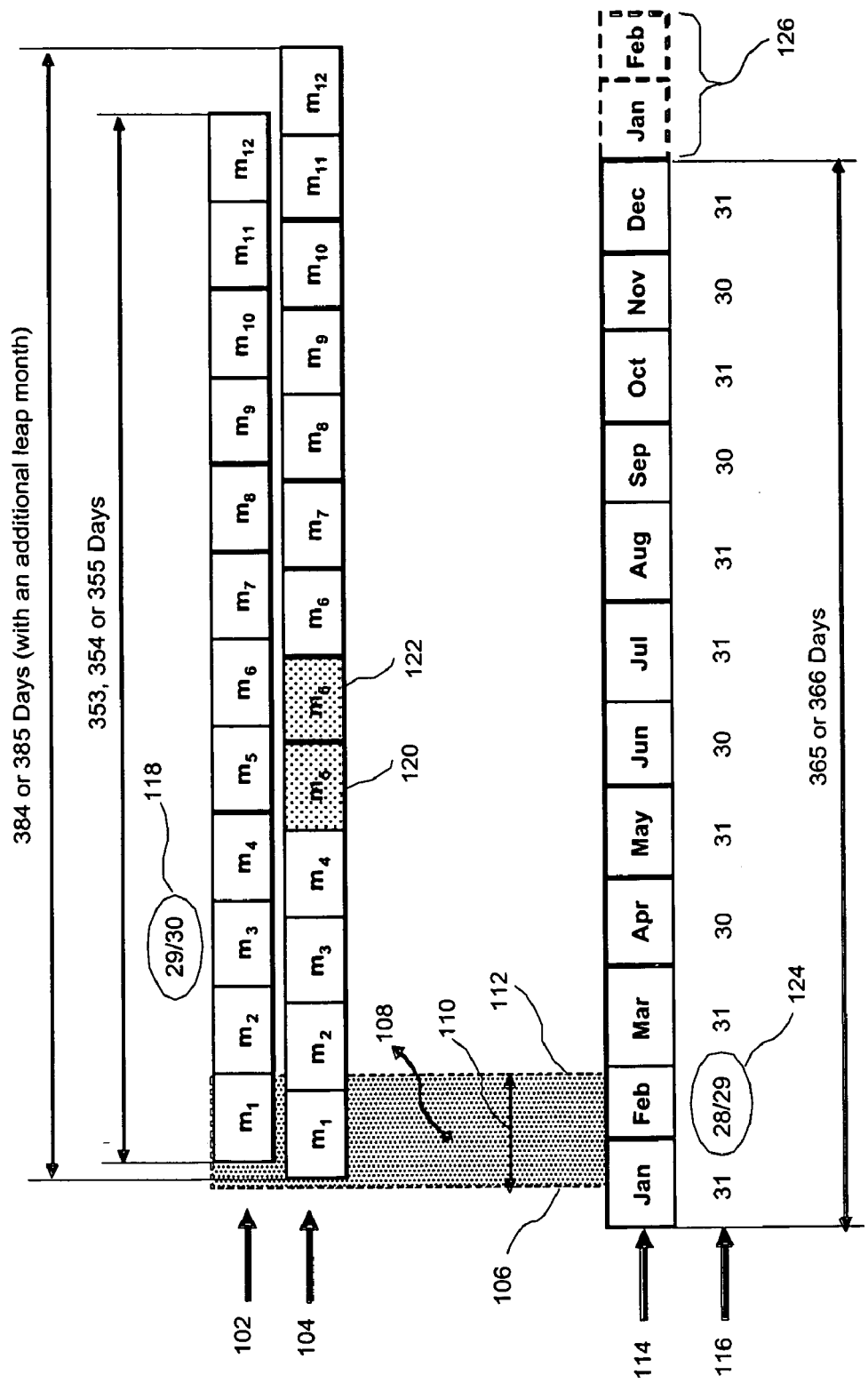
FIG. 4 illustrates that the Chinese lunar calendar is also partially solar for the regular addition of an extra leap month (runyue) to a lunar year brings the lunar year back into line with the longer solar year.

As aforementioned, the Chinese lunar calendar is partially solar because of addition of leap months regularly. In order to provide accurate tidal prediction using empirical models, the relative position of the Sun to the Earth must be taken into account. The Gregorian calendar, which is commonly used in most of the world, is based upon the length of the Earth's revolution around the Sun (and hence called a solar calendar). Referring now to FIG. 4, under the Gregorian calendar, a solar year is divided up into 12 months 114 of 30 or 31 days 116 with February 124 having 28 or 29 depending on if the year is a leap year (the January and February 126 indicated in the dash-lined squares are in next year). This gives a year of 365 or 366 days. However, the true period of the Earth's revolution around the Sun (measured from vernal equinox to vernal equinox) is 365 days, 5 hours, 48 minutes and 46 seconds. Over time this discrepancy would cause the official calendar to be out of sync with various celestial events such as the equinoxes and solstices. To rectify this, a series of leap years were added into the calendar. On a leap year an extra day is added to the end of February, February 29th. According to the Gregorian calendar, leap years occur in every year that is divisible by 4, except those that are divisible by 100 but not 400.

FIG. 4 also shows the positions of Chinese New Year (CNY) days from 2000 to 2080 with respect to the Gregorian calendar. A normal Chinese calendar year consists of 12 months 102, but a leap Chinese calendar year 104 consists of 13 months, for example, as shown in FIG. 4, there are two 5$^{th}$ months, 120, 122 in the leap year 104. The addition of extra leap months (e.g., the second m$_5$ 122) keeps the Chinese lunar calendar in sync with the longer Gregorian solar year, but varies the CNY dates along a period of the Gregorian calendar. Unlike Gregorian calendar, any Chinese lunar calendar month can have either 29 or 30 days 118, which also contributes to the variation of the CNY dates. The dotted square 108 shows the range for the CNY dates from 2000 to 2080; the range is from the 21$^{st}$ of January 106 to the 19$^{th}$ February 112; and width of the range 110 is 29 days.

Figure 5:
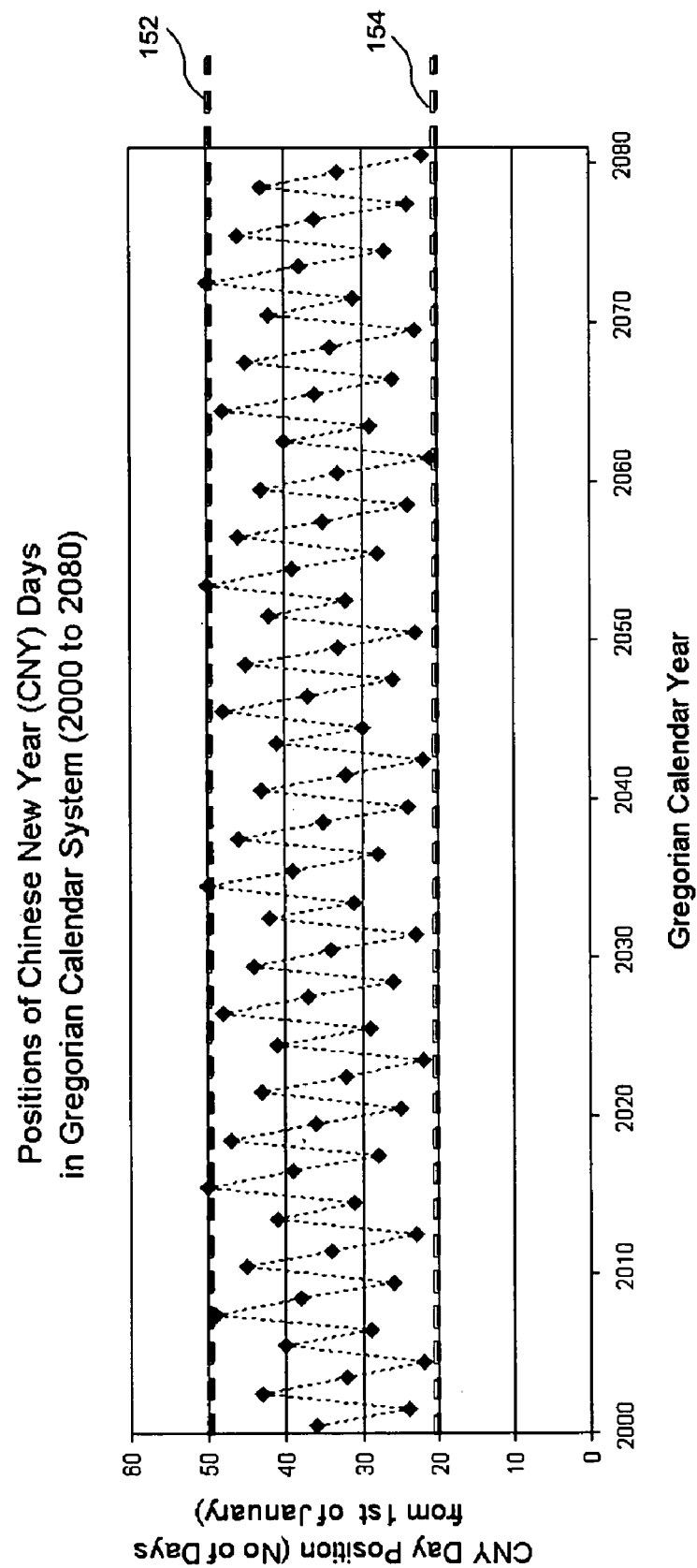
FIG. 5 is a graph showing the positions of Chinese Calendar New Year (CNY) days with respect to the $1^{st}$ of January of the Gregorian calendar year in a period from 2000 to 2080.

The actual CNY days from Year 2000 to 2080 are shown in FIG. 5. The two dashed lines indicate the up-boundary 152 (19 February), and lower-boundary 154 (21 January) of the range of the CNY days. As can be seen from FIG. 5, most of the CNY days fall in late January or in early February.

Figure 6:
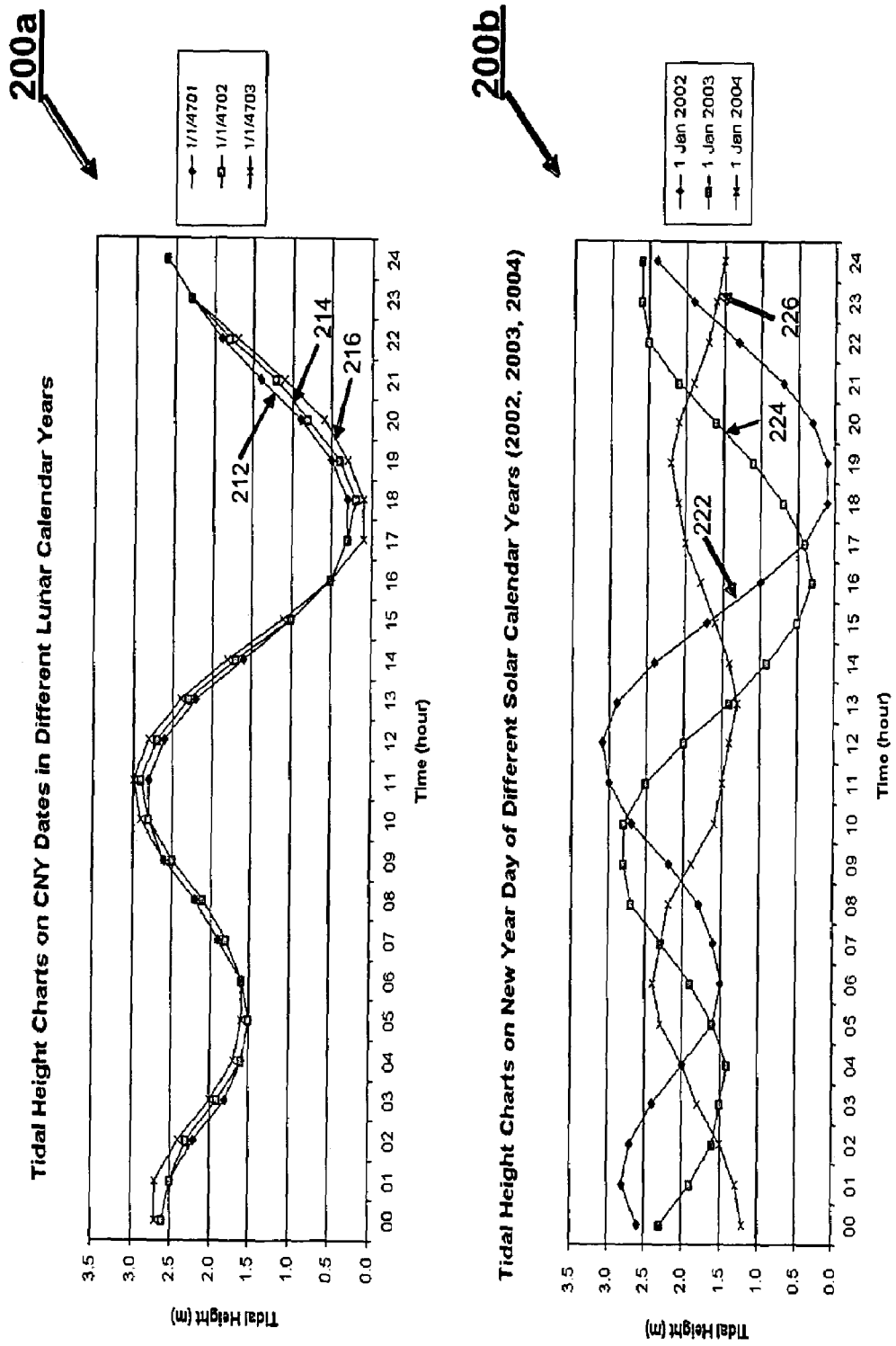
FIG. 6 illustrates the existence of the correlation between tidal height charts and Chinese lunar calendar dates, and the absence of the correlation between tidal height charts and Gregorian solar calendar dates.

Referring now to FIG. 6, the inventor of the present invention discovered that there exists a close correlation between tidal phenomena and Chinese lunar calendar. For example, as shown in FIG. 6, the tidal curve 212 is the actual tidal heights observed on the Chinese lunar calendar date Jan. 1, 4701, where the year 4701 in Chinese lunar calendar corresponds with the year 2002 in Gregorian calendar; the tidal curve 214 is the tidal heights observed on Jan. 1, 4702 (2003); and the curve 216 on Jan. 1, 4703 (2004). The tidal height chart 200a shows that the tidal curves 212, 214, 216 match the Chinese lunar calendar dates well, a close correlation between the tides and Chinese calendar dates. The reason why the close correlation exists is because we always observe a new Moon on the Chinese New Year (CNY) Day, on which we always observe spring tides. There are small deviations among the three tidal curves, 212, 214, 216 drawn in the chart 200a. The deviations are caused by deviations of the relative positions of the Sun. The Gregorian calendar dates corresponding to the CNYs of lunar year 4702, 4702 and 4703 are listed in the following Table 1.

TABLE 1

The correspondence of CNYs to Gregorian calendar dates.

| Chinese Lunar calendar date (dd/mm/yyyy) | Gregorian calendar date (dd/mm/yyyy) |
|---|---|
| 01/01/4701 | 12/02/2002 |
| 01/01/4702 | 01/02/2003 |
| 01/01/4703 | 22/01/2004 |

As can be seen from Table 1, the relative positions of the Sun to the Earth in the first new moon day of these three Chinese lunar years are not the same. More specifically, both the tidal curve 212 and the tidal curve 214 are observed on the CNYs of lunar 4701 and 4702, but their corresponding Gregorian dates are Dec. 2, 2002 and Jan. 2, 2003 respectively; the difference is eleven earth days, meaning that, although a new moon appears at CNYs, the earth's position relative to the Sun has changed. Considering that the period of the Earth's revolution around the Sun is about 365 days, the period of eleven earth days makes an angular distance of 11.15 degrees. Considering that the Sun only has about 30% gravitational attractions on the tide, the vertical influence of the 11.15 degree angular distance of the Sun's position relative to the Earth can be calculated as follow: $\Delta T_v \approx (1-\cos(11.15°))\% \approx 1.88\%$. Therefore, unlike the moon phase's changes, this angular distance (11.15 degrees) does not really generate a significant impact on the close correlation between the tides and Chinese lunar calendar dates, as can be seen from the tide charts 200a in FIG. 6.

On the other hand, however, there is no correlation between the tidal charts and Gregorian calendar dates as shown in the tidal charts 200b. It is not possible to create a regression model to generate the tidal curves 222, 224 and 226, because the heights of the tides and times of arrival of the high tides are so much different. This is because on the new-year days of Year 2002, 2003 and 2004, the moon phases have changed significantly, as can be seen from the corresponding Chinese lunar calendar dates listed in Table 2 below.

TABLE 2

The correspondence of Gregorian calendar dates to Chinese lunar calendar dates.

| Gregorian calendar date (dd/mm/yyyy) | Chinese Lunar calendar date (dd/mm/yyyy) |
|---|---|
| 01/01/2002 | 18/11/4700 |
| 01/01/2003 | 29/11/4701 |
| 01/01/2004 | 10/12/4702 |

Now there is provided a more detailed description of the Chinese lunar calendar-based tide prediction method in accordance with one embodiment of the present invention. The present method comprises generating a regression model for each reference year from actual observed tidal data, selecting a reference year, converting a requested Gregorian date into a Chinese lunar calendar date, making the prediction of tidal height for the Chinese lunar calendar date based on the regression model generated for the reference year, and outputting the prediction. While individual operations, programs, and steps are described sequentially, it is to be appreciated that the sequential description is for the sake of the convenience of narration only; it by no means denotes that the method requires such a sequence of operations, programs, and steps. In practice, many operations, programs, and steps may be performed according to each situation. For example, the actual observed tidal data may be inputted by the user via the user input interface or downloaded from another source where the actual observed tidal data for any reference year is stored. In addition, the Chinese lunar calendar data with virtual days may be created and stored so that it is ready for use when it is needed. Furthermore, the regression model of tidal heights for any reference year may be made and stored so that it can be retrieved for prediction when a reference year is selected upon receipt of the prediction request.

Figure 7:
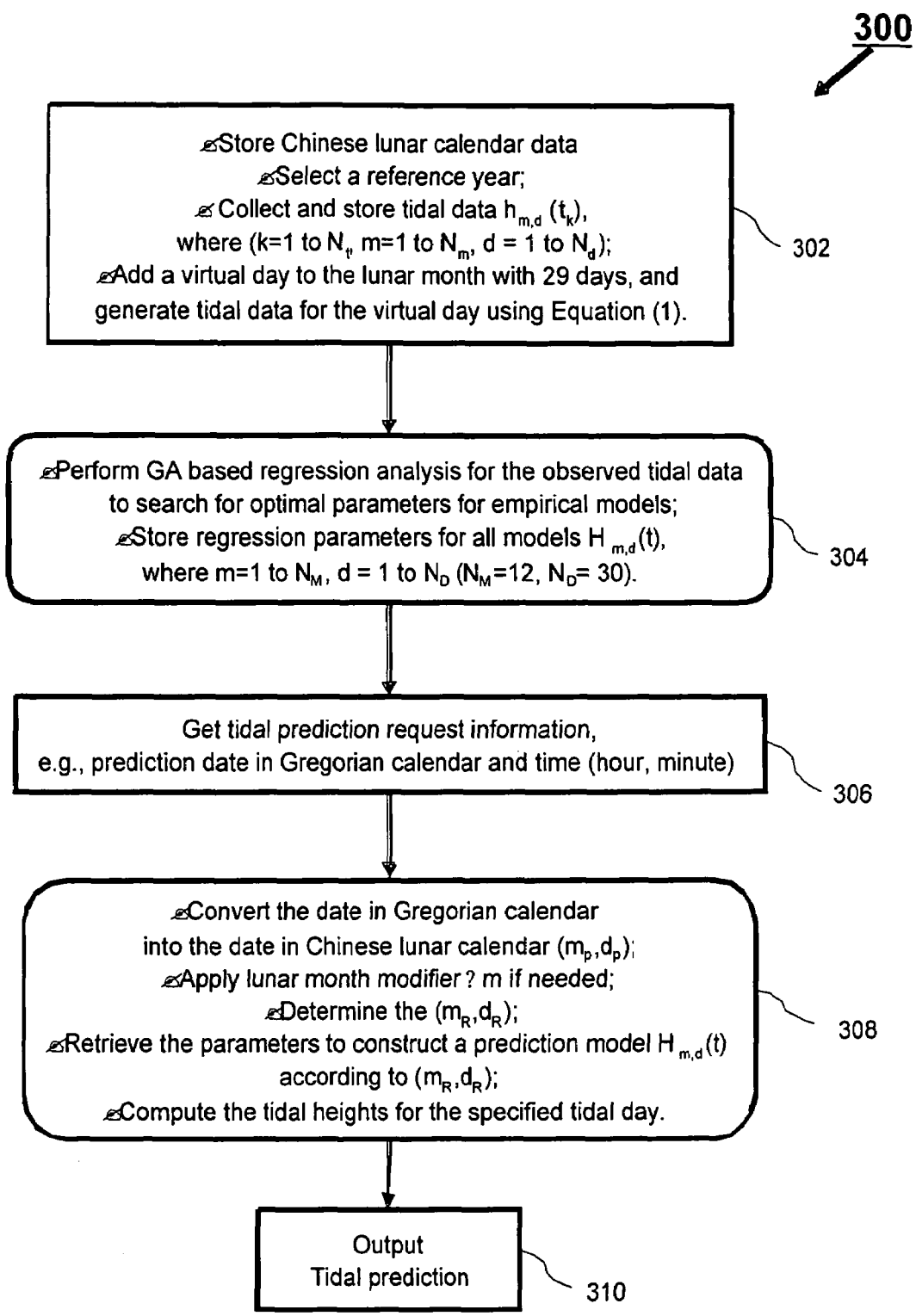
FIG. 7 is a flowchart of the method for predicting tidal height using the Chinese lunar calendar-based tidal prediction system of FIG. 1 in accordance with one embodiment of the present invention.

Referring now to FIG. 7, there is provided a main flowchart of the Chinese lunar calendar-based tidal prediction method 300 in accordance with one embodiment of the present invention. The method 300 starts at the data set-up step 302 which includes: storing the Chinese lunar calendar data 70; selecting a reference year; collecting and storing or downloading actual observed tidal data; adding a virtual day to the lunar month with 29 days; and generating tidal data for the virtual day using Equation (1) described in detail below.

The Chinese lunar calendar data is employed for the conversion between the Chinese lunar calendar date and the Gregorian calendar date. Thus, the Chinese lunar calendar data may be stored in the tidal prediction system of the present invention as shown in FIG. 1 or retrieved from another source via cable or wireless means when the Chinese lunar calendar data is required for such conversions. The Chinese lunar calendar data may take any form that is suitable for the present application. The Chinese lunar calendar data 70 as shown in FIG. 3 is one exemplary data representation model used for date conversion.

At the step 302, when a user selects a reference year, the method 300 then prepares the tidal data for the reference year. The selected reference year is denoted as $Y_R$. The reference year may be the Chinese lunar calendar year during which a complete set of tidal height readings $\Omega$ have been collected and stored. For each tidal day d in a lunar month m, the tidal height readings are denoted as $\Omega_{m,d}$; the tidal height readings $\Omega_{m,d} = \{h_{m,d}(t_1), h_{m,d}(t_2), h_{m,d}(t_3), \ldots, h_{m,d}(t_k), \ldots, h_{m,d}(t_{Nt-1}), h_{m,d}(t_{Nt})\}$, where $t_k$ is the time at which the water level reading is taken, and $N_t$ the number of tidal height readings taken during day d. The empirical tidal prediction model generated using GA based regression analyzer program 40 in FIG. 1 based upon the actual tidal height data $\Omega_{m,d}$ are denoted as $H_{m,d}(t_k)$. As mentioned above, the actual tidal data for a reference year may be inputted by the user of the present method after the selection of the reference year or collected and stored before the selection of the reference year so that the actual tidal data of the reference year may be retrieved when the reference year is selected. It is recommended that tidal height readings be taken regularly once every hour, i.e., the number of readings in a day $N_t$ is 24; although the observed tidal data can be taken irregularly any times at irregular time intervals during a day. It is noted that the reference year can also be a Gregorian calendar year, as dates in Gregorian calendar year can be converted to Chinese lunar calendar dates.

If the reference year is a normal lunar year without an additional leap month being added, the value of m is from 1 to 12. As aforementioned, the number of days in a month in the Chinese lunar calendar can vary between 29 and 30 days. For example the 6$^{th}$ month in the reference Chinese lunar year 4702 (2003) has only 29 days (see Table 70 in FIG. 3). The last prediction model in the 6$^{th}$ month which is generated by the GA based regression analysis 304 is $H_{6,29}(t_k)$. However, in Chinese lunar year 4703 (2004), the 6$^{th}$ month has 30 days, so there does not exist the actual model $H_{6,30}(t_k)$ for use to predict the tidal height when m=6 and d=30 in 4703(2004) if 4702(2003) is selected as the reference year. The present invention solves this problem by adding a virtual day to the $6^{th}$ month of the reference Chinese lunar year, 4702(2003). In practice, one virtual day will be added into any month of the reference year that has 29 days as shown in step 302 of FIG. 7. The tidal data of the added virtual day could be derived in many ways. In one embodiment of the present invention, the approximate prediction model for the virtual day $H_{m,30}(t)$ is constructed using mean value of previous day's and next day's actual tidal height data collected, shown as follows:

$$h_{m,30}(t_k) = \frac{1}{2} \times [h_{m,29}(t_k) + h_{m+1,1}(t_k)] \quad (1)$$

It is noted that equation (1) is only used to generate a set of tidal data, and the GA regression analysis must be used to create a tidal prediction model $H_{m,30}(t_k)$ for the virtual day. It is also noted that in Equation (1), in a normal lunar year without leap month, if m is equal to 12, then the month (m+1) should be the first lunar month rather than month 13.

The addition of virtual days into Chinese lunar calendar data may be separated from the generation of tidal data for the virtual days. As discussed above, the months with 29 days are known for the years up to 2080 so that the Chinese lunar calendar data may include all the virtual days. When the tidal data is available, the tidal data for the virtual days may be generated and stored for ready to use with the available actual tidal data or generated when a reference year is selected.

The method 300 at step 304 then performs GA-based regression analysis of the actual tidal data $\Omega_{m,d}$ of the chosen reference year to search for optimal parameters and consolidate the empirical tidal prediction models $H_{m,d}(t_k)$, where m=1 to $N_m$, and d=1 to $N_d$. Note that $N_m$=12 and $N_d$=30. Detailed description of the GA based regression analysis 304 will be given later in reference to FIGS. 9-13.

Once the data set up step 302 and the prediction model creation step 304 have been completed, the tidal prediction system is ready for use to predict tidal heights. At step 306, the method 300 gets the tidal prediction request information from the user via the interface 12 in FIG. 1. The input information includes prediction date in Gregorian calendar and time in hour and minutes.

The method 300 then processes the user input at step 308 to convert the prediction date in Gregorian calendar into a corresponding Chinese lunar calendar date, denoted as ($m_p$, $d_p$), using the calendar converter program 46 in FIG. 1.

However, the Chinese lunar calendar date ($m_p$, $d_p$) may not be used directly for tidal prediction in certain situations. As also aforementioned, the Chinese lunar calendar has leap months for certain years. It poses the problem of which reference month should be based for prediction. For example, a normal reference $Y_R$ may be represented in the following expression (2):

$$Y_R = \{m_{R1}, m_{R2}, m_{R3}, m_{R4}, m_{R5}, m_{R6}, m_{R7}, m_{R8}, m_{R9}, m_{R10}, m_{R11}, m_{R12}\} \quad (2)$$

The prediction models generated based upon the tidal data collected in the reference year $Y_R$ (e.g., CNC 4702, or Gregorian year 2003) may be used to predict tidal heights for any other Gregorian Year. However, when the Gregorian year 2004 (CNC 4703) is the prediction year, it has 13 months represented by the following Expression (3):

$$Y_P = \{m_{P1}, \mathbf{m_{P2}}, m_{P2}, m_{P3}, m_{P4}, m_{P5}, m_{P6}, m_{P7}, m_{P8}, m_{P9}, m_{P10}, m_{P11}, m_{P12}\} \quad (3)$$

where the $3^{rd}$ month marked in bold, i.e., $m_{P2}$, is a leap month.

Figure 8:
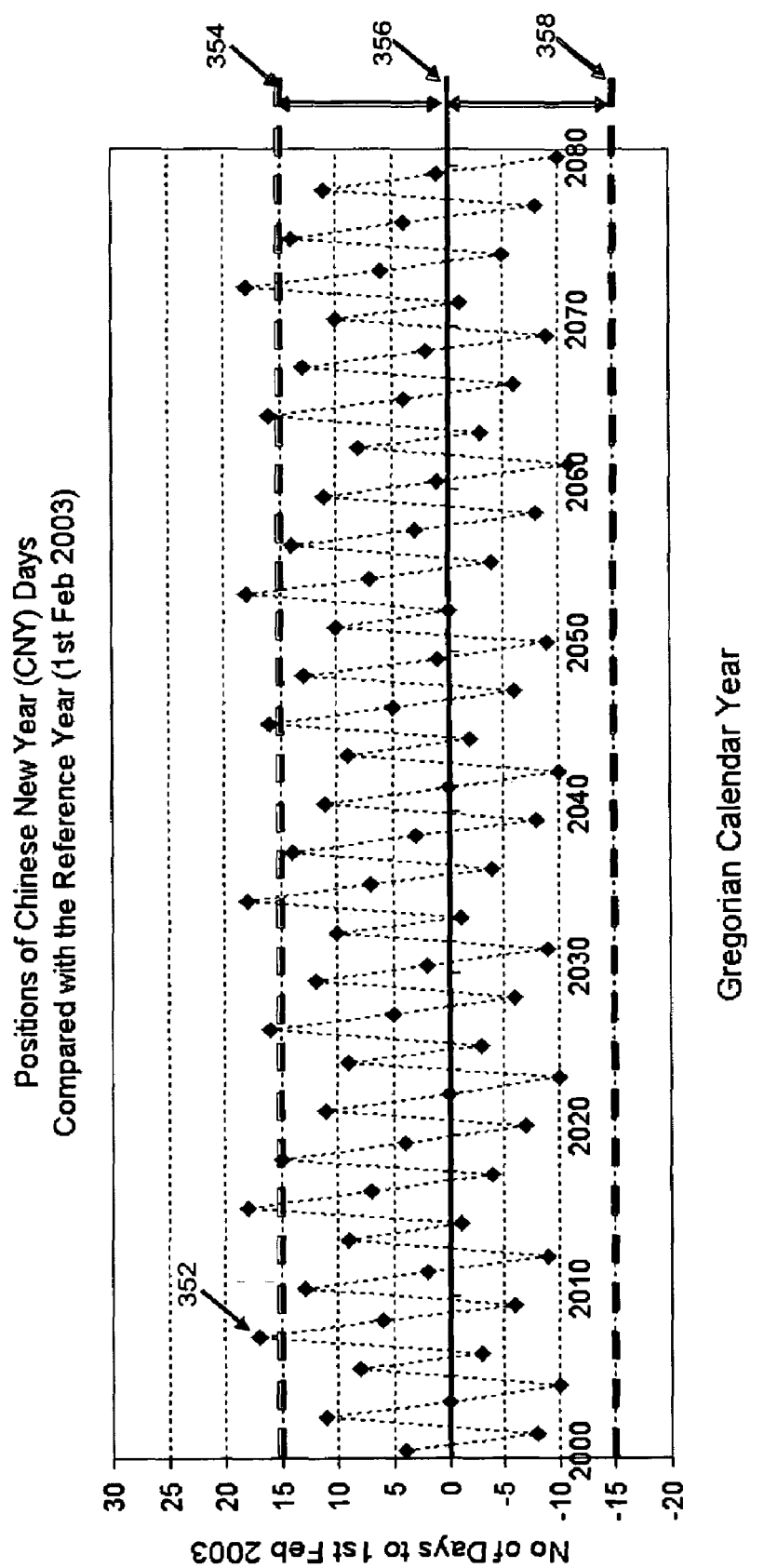
FIG. 8 shows the Chinese Calendar New Year (CNY) day's positions with respect to the CNY date of the exemplary reference year ($1^{st}$ of Feb. 2003) for determining the lunar month adjusting factor in accordance with one embodiment of the present invention.

There is provided a lunar month adjust factor to tackle this problem in accordance with one embodiment of the present invention. FIG. 8 shows the Chinese Calendar New Year (CNY) days from 2000 to 2080 in reference to the CNY day of 2003 (1 February). The graph shows that most of the Chinese New Year (CNY) days are positioned either late in January or early in February. Therefore, it is desirable to select a year as the reference year whose CNY day is positioned near the center of the CNY day range from lower boundary 154 to up boundary 152 in FIG. 5. For instance, the Gregorian Year 2003 is a good example as a reference year $Y_R$ because its CNY day 356 is on the $1^{st}$ of February, and it is a normal lunar year without a leap month. It is noted that in practice any year can be used as the reference year.

It is important to point out that although every lunar month in a Chinese lunar year represents precisely the relative positions of the Moon to the Earth, the start date (CNY day)'s position in Gregorian calendar varies, and so does the start date of each of other lunar months (from $2^{nd}$ to $12^{th}$ lunar month). The CNY year represents the relative position of the Sun to the Earth, which is also important because the Sun has about 30% influence on the tide. Therefore, it is necessary to introduce a lunar month adjust factor $\Delta m$ to make sure that the start date of the prediction month $m_{Pk}$, (where k=1 to 12) is NOT too further away from the start date of the corresponding reference month $m_{Rk}$ (k=1 to 12). Therefore, the real reference month used for tidal prediction should be decided by the following equation:

$$m_{Rk} = m_{Pk} + \Delta m \quad (4)$$

The lunar month adjusting factor $\Delta m$ is defined as follows:

$$\Delta m = \begin{vmatrix} -1 & \text{if}(\Delta d > 15) \\ 0 & \text{if}(-15 \leq \Delta d \leq 15) \\ +1 & \text{if}(\Delta d < -15) \end{vmatrix} \quad (5)$$

In the Equation (5), $\Delta d$ is calculated using Equation (6).

$$\Delta d = f_{Rsd}(m_{Pk}) - f_{Psd}(m_{Pk}) \quad (6)$$

In the Equation (6), $\Delta d$ is the day difference, i.e., the number of days between the start date of the lunar month $m_{pk}$ in reference year and the start date of the lunar month $m_{pk}$ in prediction year. $f_{Rsd}(m_{pk})$ is a function that yields the start date of month $m_{pk}$ in reference year $Y_R$ in form of corresponding Gregorian calendar day and month (dd/mm), and similarly $f_{Psd}(m_{Pk})$ yields the start date of month $m_{pk}$ in prediction year $Y_P$ in form of corresponding Gregorian calendar day and month (dd/mm). For example, if the prediction lunar month is a third month ($m_{Pk}$=3) and the reference year is the lunar year 4702 (Gregorian calendar year 2003), the $f_{Rsd}(3)$ yields the $2^{nd}$ of April, which is the start date of the $3^{rd}$ lunar month ($m_{Rk}$=3) in reference year 2003. The function $f_{Psd}(3)$ yields the 19th of April, which is the start date of the lunar month ($m_{Pk}$=3) in prediction year 4703 (Gregorian calendar year 2004). Thus, according to Equation (6), $\Delta d$=(02/April)−(19/April)=−17. Form equation (5), $m_{Rk}$=$m_{Pk}$+$\Delta m$=3+1=4. Therefore, the real reference month used for tidal prediction should be the $4^{th}$ month ($m_{Rk}$=4) rather than the $3^{rd}$ month.

It is worth pointing out that the reason why the start date of the 3$^{rd}$ lunar month in prediction year 2004 is shifted so many days away from the start date of the same lunar month in reference year 2003 is because a leap month is added, which is second lunar month in lunar year 4703 (Gregorian year 2004), as shown in FIG. 3. In this particular case, likely, the lunar month adjust factor Δm need to be applied from the 3$^{rd}$ lunar month onwards.

Referring now to FIG. 8, the Equation (5) actually draws boundaries for the selection of prediction model, an up-boundary 354 and a lower-boundary 358. If the start day of a prediction month is beyond the up-boundary, say, CNY day (e.g., 18/02/2007) 352 of Year 2007, considering that CNY date 356 of the reference year is Jan. 2, 2003, from Equation (5), we have Δd=−16. Therefore, according to Equation (4), $m_{R1}$=1+1, e.g., the prediction models of second lunar month in reference year should be used. That is, the correspondent lunar month, $m_{R1}$=2, should be used as the key to retrieve the regression model parameters for tidal prediction. Note that $d_{R1}$=1, because CNY is the first day of the first lunar month $m_{P1}$. The FIG. 8 only illustrates the boundaries for the selection of prediction model for the first month; same method, e.g., equation (4), (5), and (6), is applied to all other lunar months in the prediction year to determine the lunar month ($m_R$) as the key to retrieve model parameters for tidal prediction.

By applying the lunar month adjust factor Δm, the maximum angular distance, $(\Delta\beta_S)_{max}$, of the Sun relative to the Earth, which is caused by Δd, is 15.2 degrees, where, $(\Delta\beta_S)_{max}$=(15 days)×(365/360)=15.2 degrees. The maximum angular distance (15.2 degrees) of the Sun's position relative to the Earth can only have a vertical influence of $\Delta T_r \approx (1-\cos(15.2°))\% \approx 3.5\%$ on the tide generation. Because the Sun only has about 30% gravitational attractions on the tide, the maximum angular distance, $(\Delta\beta_S)_{max}$=15.2 degrees, only has approximately 1.05% of the vertical influence on the overall tide generation.

Referring back to FIG. 7, it is noted that the steps 302 and 304 in method 300 are one-time set-up steps, for one water station, there is no need to repeat these steps unless some model parameters need to be modified using Model Parameter Editor 42 via user interface 12 in FIG. 1. The tidal prediction method 300 gets, via user interface 12, the tidal prediction request information, e.g., date in Gregorian calendar and time in hour and minute. Thereafter at step 308 the method 300 converts the date in Gregorian calendar into the date in Chinese lunar calendar ($m_P$,$d_P$) and applies lunar month modifier Δm if applicable, then determines the ($m_R$, $d_R$) for retrieving the parameters to construct a prediction model $H_{m,d}(t_k)$ that will be used by the system to compute the tidal heights for the specified tidal day.

Finally, at step 310, the tidal prediction method outputs tidal prediction results either in text format, in graphics mode, or directly transfer the output to other integrated software systems which needs the prediction data.

Figure 9:
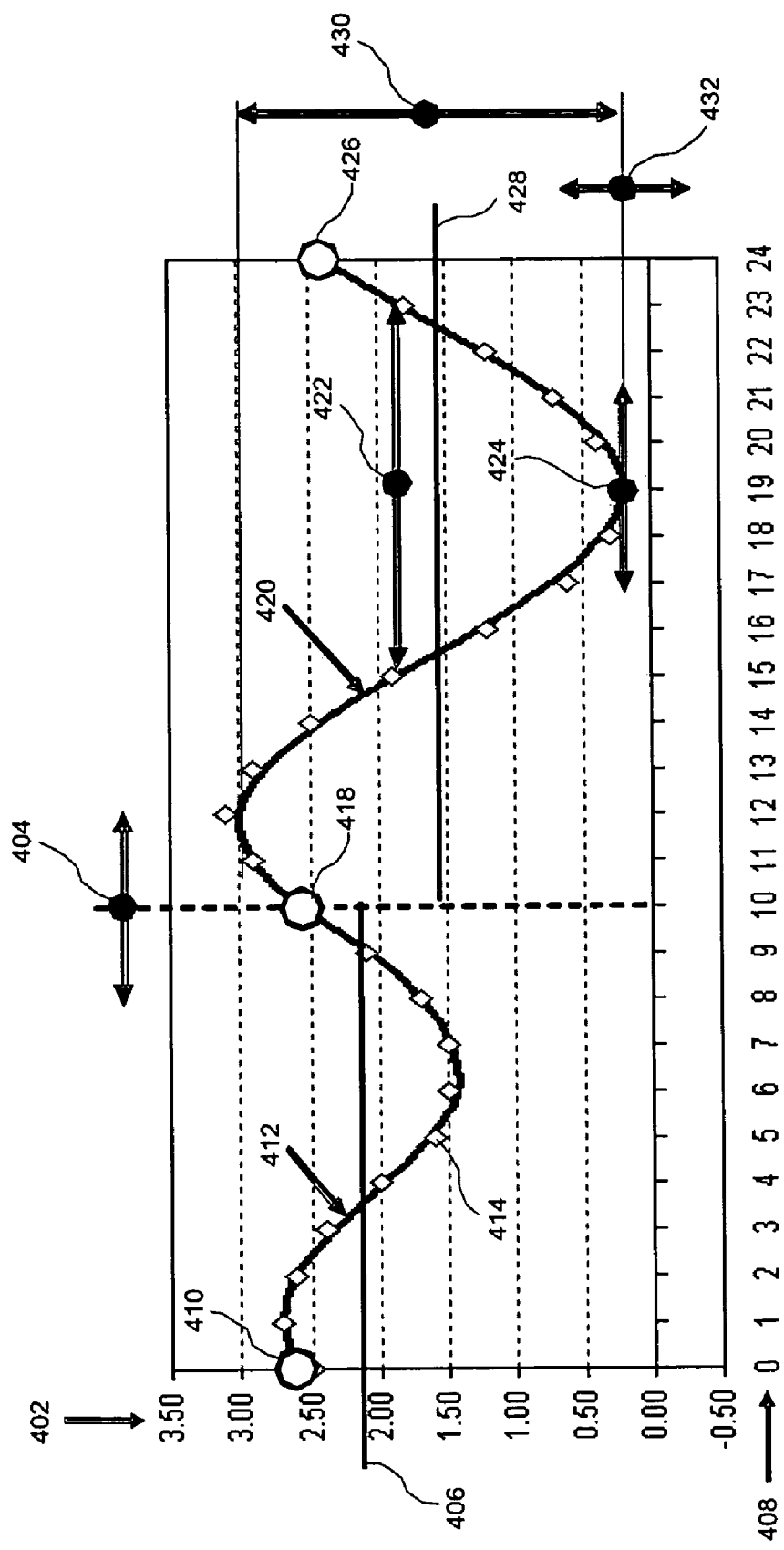
FIG. 9 illustrates division of tidal curve segments, and generation of multiple regression parameters defined for tidal height curve-fitting and empirical model creation in accordance with one embodiment of the present invention.

Now there is provided more detailed description of generating the prediction models based on observed tidal data. Referring to FIG. 9, there is provided a typical set of tidal data recorded in one day. The actual tidal heights 414 are recorded as a series of data in the following format: $h_{m,d}(t_k)$, the tidal height at time $t_k$ of day d of month m. Where, the tidal height 402 is in meter, and the tidal observations can be regularly or irregularly taken. But it is recommended that tidal height readings be taken once per hour 408 every day in the reference year. Time is from 00:00 to 24:00, where the 24:00 is 00:00 a.m. on next day.

Because the astronomical tide-producing forces are harmonic in nature, cosine function is adapted as the regression model to fit the actual tidal data, as shown in FIG. 9. The tidal curve is not a perfect cosine curve in most of the cases. Therefore, the tidal curve is divided into two segments 412, 420, and various adjusting factors are included in the regression model in order to accommodate variations of the range of the tides, arrival times of the high tides, and different types of tides, e.g., diurnal, semidiurnal and mixed types of tides. The basic regression model is proposed as follows:

$$H_{m,d}(t_k) = \begin{cases} x_{m,d}^{P_1} + R_{m,d}^{P_1} \times \cos\left[(4\pi + \Delta A_{m,d}^{P_1}) - a_{m,d}^{P_1} \times s_{m,d}^{P_1} \times t_k\right] + v_{m,d}^{P_1} & (0 \leq t_k \leq p_{m,d}) \\ x_{m,d}^{P_2} + R_{m,d}^{P_2} \times \cos\left[(4\pi + \Delta A_{m,d}^{P_2}) - a_{m,d}^{P_2} \times s_{m,d}^{P_2} \times t_k\right] + v_{m,d}^{P_2} & (p_{m,d} < t_k \leq 24) \end{cases} \quad (7)$$

In Equation (7), $H_{m,d}(t_k)$ is the tidal height prediction function, where, $t_k$ is time (interval is one minute), m is the lunar month index (ranged from 1 to 12), d is tidal day index (from 1 to 30 at maximum). The fitting curve is divided at point $p_{m,d}$ 404 into two segments: segment$_1$ 412 with period $p_1$ ($0 \leq t_k \leq p_{m,d}$), i.e. the segment of the fitting curve from point 410 to point 418 and segment$_2$ 420 with period $p_2$ ($p_{m,d} \leq t_k \leq 24$), i.e., the segment of the fitting curve from point 418 to point 426.

The factor $x^{P_2}_{m,d}$ is the mean value 428 of the tidal heights during period $p_2$. $R^{P_2}_{m,d}$ is an amplitude factor 430 in period $p_2$, which is used to adjust the fitting curve to fit range of the tidal heights. $\Delta A^{P_2}_{m,d}$ is phase adjustment factor in period $p_2$ and $a^{P_2}_{m,d}$ is the angular adjustment factor in period $p_2$. Both $\Delta A^{P_2}_{m,d}$ and $a^{P_2}_{m,d}$ can adjust arrival times of the tides 424. $s^{P_2}_{m,d}$ is tidal curve stretch factor 422 in period $p_2$. $v^{P_2}_{m,d}$ is a micro-tidal height adjustment factor 432 in period $p_2$ which can move the fitting curve up and down to fit originally observed tidal data. There is a same set of parameters defined for period $p_1$.

Once the tidal curve segment divider $p_{m,d}$ is determined, $x^{P_1}_{m,d}$, the mean value 406 of the tidal heights during period $p_1$, can be calculated using following Equation (8).

$$x_{m,d}^{P_1} = \frac{1}{N_{P_1}} \sum_{t_k=0}^{N_{P_1}} H_{m,d}^{P_1}(t_k) \quad (8)$$

Similarly, $x^{P_2}_{m,d}$, the mean value 428 of the tidal heights during period $p_2$ can be calculated as follows:

$$x_{m,d}^{P_2} = \frac{1}{N_{P_2}} \sum_{t_k=N_{P_2}}^{24} H_{m,d}^{P_2}(t_k) \quad (9)$$

Where $N_{P_1}$ is the number of data collections during the period from 0 to $p_{m,d}$; $N_{P_2}$ the number of data collections during the period from $p_{m,d}$ to 24 hour; $h^{P_1}_{m,d}(t_k)$ the tidal height observed at time $t_k$ during period $p_1$ at day d in month m; and $h^{P2}_{m,d}(t_k)$ the tidal height observed at time $t_k$ during period $p_2$ at day d in month m.

In the Equation (7), $a^{P1}_{m,d}$, the angular adjustment in period $p_1$ is computed as follows:

$$a^{P1}_{m,d} = \frac{4\pi}{N_H \times 60} \quad (10)$$

Where $N_H$ is the number of hours during a tidal day period (normally $N_H$=24 hours). And it is noted that because time interval is a constant for the whole software application, therefore $a^{P1}_{m,d}$ is equal to $a^{P2}_{m,d}$.

The Equation (7) is a generic model used for tidal curve-fitting or regression analysis. For every tidal day d in every lunar month m, every lunar day d, in the reference year $Y_R$, the model $H_{m,d}(t_k)$ has a specific set of parameter values. As can be seen from FIG. 10, there are $N_m \times N_d$ empirical prediction models, each of them being associated with a lunar month and a tidal day in the reference lunar year. Where $N_m$ is the number of months in a reference lunar year $Y_R$, and $N_d$ the number of days in each lunar month. It is recommended that a normal lunar year without a leap month be selected as the reference year $Y_R$, e.g., the number of months $N_m$ is equal to 12. $N_d$ is the number of days in each lunar month, where $N_d$=30. For months having 29 days, a virtual day will be added by ways as discussed hereinbefore.

Figure 10:
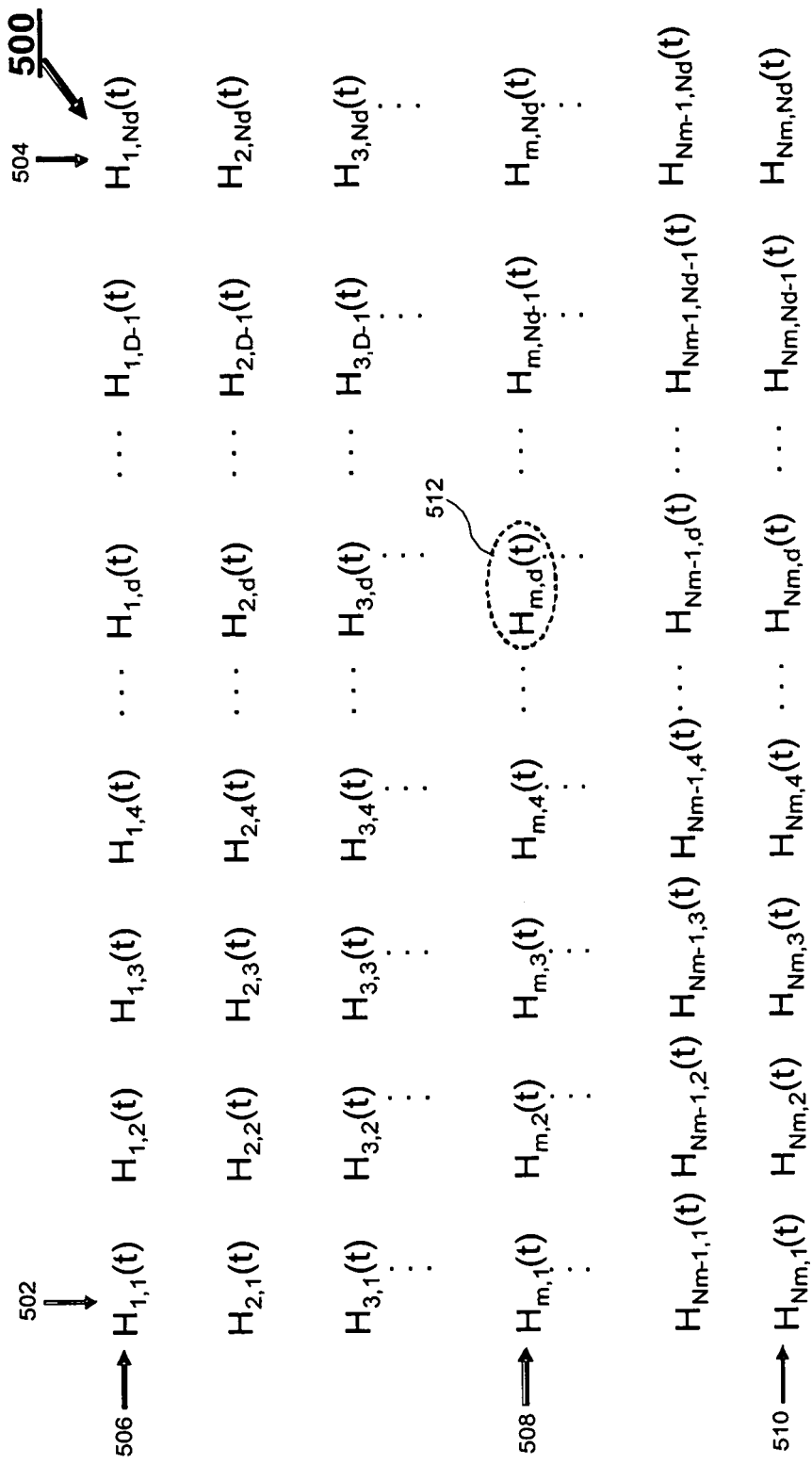
FIG. 10 is a matrix representation of the tidal prediction models, each model being indexed using the Chinese lunar month m and day d.

Referring to FIG. 10, the prediction models are presented in form of an $N_m \times N_d$ matrix 500. The first row 506 represents the tidal prediction models for the first lunar month. The last row 510 represents the tidal prediction models for last lunar month (the 12$^{th}$ lunar month). The models in first column 502 are used to predict tidal heights (spring tide) for first day (new Moon) of every lunar month, the models in last column 504 for tidal prediction of last day of very month. $H_{m,d}(t)$ 512 in Row m and Column d 508 is generic representation of the prediction model. When the day index is 1 or 15, the model is used to predict the tidal height (spring tide) when the Moon appears to be a "new moon", or "full moon".

Figure 11:
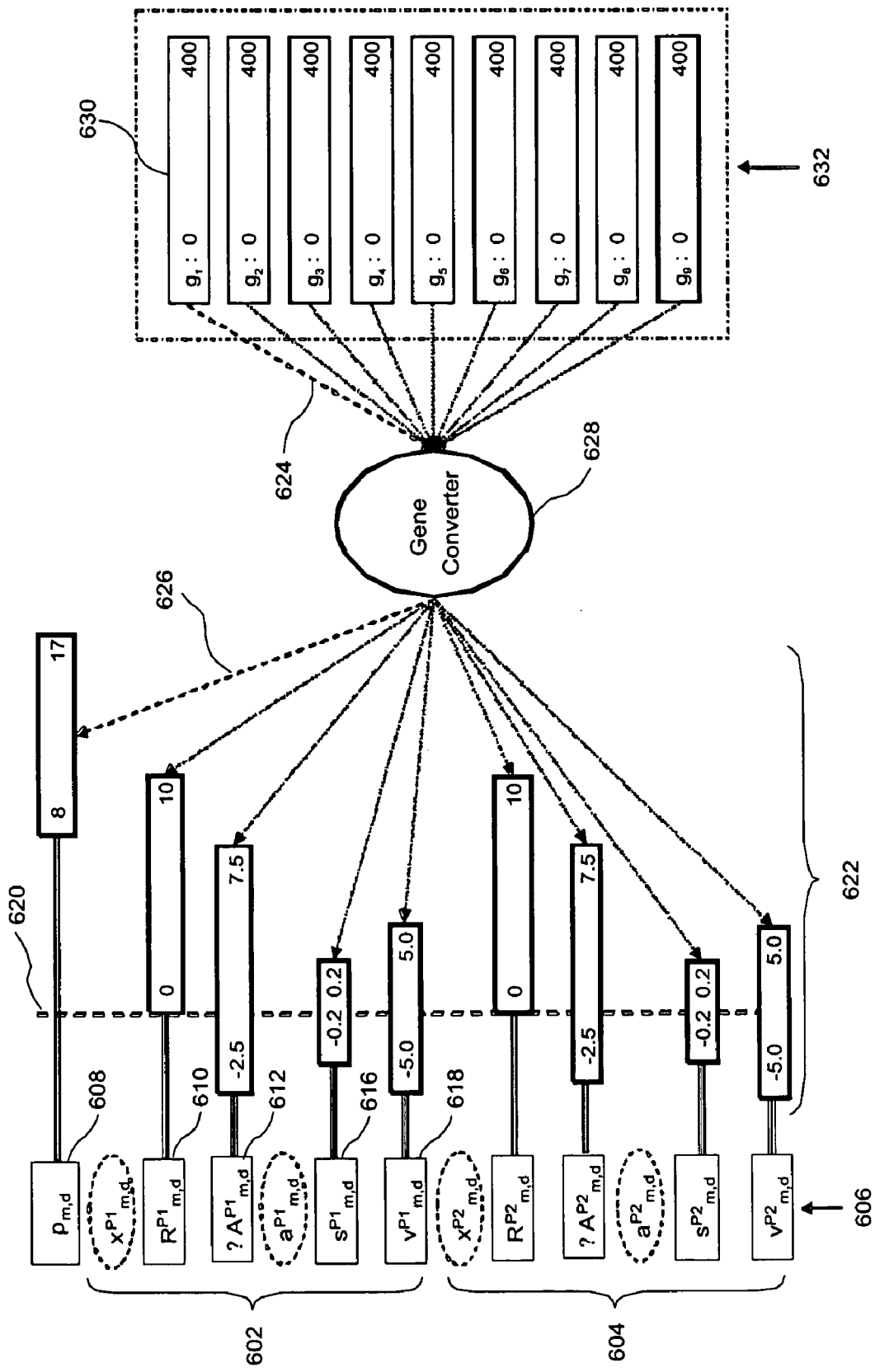
FIG. 11 illustrates how chromosomes containing genes with a fixed range of integer numbers are converted into actual parameters of the regression models of FIG. 10.

Referring to FIG. 11, as an exemplary illustration, FIG. 11 lists the range of the possible values of the regression parameters 606 included in the prediction model (Equation (7)). For example, the value of tidal curve segment divider $p_{m,d}$ 608 is ranged from 8 to 17 (hour); $R^{P1}_{m,d}$, an amplitude factor 610 in period $p_1$, ranged from 0 to 10; $\Delta A^{P1}_{m,d}$, 612, the phase adjustment factor, ranged from −2.5 to 7.5; $s^{P1}_{m,d}$, 616, the tidal curve stretch factor, ranged from −0.2 to 0.2; and finally $v^{P1}_{m,d}$ 618, the micro-tidal height adjustment factor, ranged from −5.0 to 5.0. In FIG. 11, the dashed vertical line 620 (value=0) is drawn as a datum for parameter value comparison purpose. The value ranges of the parameters 602 in period $p_1$ are the same as the values of the parameters 604 in period $p_2$.

It should be noted that although the range of the sample values of the regression parameters in the preferred embodiment has been described in detail, various modifications and improvements can be made by a person skilled in the art without departing from the principles of the present invention.

The parameters $x^{P1}_{m,d}$, $x^{P2}_{m,d}$, $a^{P1}_{m,d}$, and $a^{P2}_{m,d}$ are not independent parameters, which can be calculated using Equation (8), (9) and (10) respectively. For illustration purpose, to differentiate them from independent variant parameters, they are circled using dashed ellipses in FIG. 11.

For every tidal prediction model, the values of the independent variant parameters, such as $P_{m,d}$, $R^{P1}_{m,d}$, $\Delta A^{P1}_{m,d}$, $s^{P1}_{m,d}$, $v^{P1}_{m,d}$, $R^{P2}_{m,d}$, $\Delta A^{P2}_{m,d}$, $s^{P2}_{m,d}$, $v^{P2}_{m,d}$ 606 are determined and optimized by the Genetic Algorithms based regression analyzer 40 in FIG. 1.

A Genetic Algorithms (GA) system is specially designed to search for optimal values of the tidal prediction model parameters, such as $p_{m,d}$, $R^{P1}_{m,d}$, $\Delta A^{P1}_{m,d}$, $s^{P1}_{m,d}$, $v^{P1}_{m,d}$, $R^{P2}_{m,d}$, $\Delta A^{P2}_{m,d}$, $s^{P2}_{m,d}$, $v^{P2}_{m,d}$ 606 based upon the principles of natural evolution, which depends substantially on fitness. In the GA based regression analyzer program, solution of a parameter-searching problem is encoded in a chromosome 632 in FIG. 11. Each unit of the chromosome, known as a gene 630, is a variable with a pre-defined range of values. Genetic Algorithms are well known to those skilled in the art. Briefly, Genetic algorithms operate on a population of encoded solutions or chromosomes in a selection-reproduction evolution cycle. The first generation of a selection-reproduction evolution cycle consists of a number of randomly generated chromosomes, which are selected according to a fitness quality. Selected fit members of the first generation are put into a mating pool for reproduction from which a new generation is derived by combining (crossover) or altering (mutating) genes among individuals within the population. The selection-reproduction evolution cycle repeats until an optimal set of parameter settings, which generate a fittest prediction curve to the observed tidal data, is found or after a number of predetermined evolution cycles.

In a traditional GA system, the solution space of the problem being addressed is encoded using chromosomes with a fixed length. A chromosome is typically denoted using $C_k$, where k=1 to Z, and Z denotes population size. Each chromosome can have $L_C$ genes such that $C_k=(g_{k,1}; g_{k,2}; g_{k,3}; g_{k,4}; \ldots, g_{k,Lc-1}, g_{k,Lc})$. In the GA based regression analyzer program, the length of the chromosome is equal to 9 ($L_C$=9). The Table 3 below shows how the genes 632 are mapped into the model parameters 606.

TABLE 3

The correspondence between genes and model parameters

| $g_1$ | $g_2$ | $g_3$ | $g_4$ | $g_5$ | $g_6$ | $g_7$ | $g_8$ | $g_9$ |
| --- | --- | --- | --- | --- | --- | --- | --- | --- |
| $p_{m,d}$ | $R^{P1}_{m,d}$ | $\Delta A^{P1}_{m,d}$ | $s^{P1}_{m,d}$ | $v^{P1}_{m,d}$ | $R^{P2}_{m,d}$ | $\Delta A^{P2}_{m,d}$ | $s^{P2}_{m,d}$ | $v^{P2}_{m,d}$ |

There are basically two types of chromosomes: continuous (binary) chromosomes, and enumerated (integer) chromosomes. The continuous chromosomes are used to encode solution parameters which are decimal numbers, while enumerated chromosomes are utilized to encode the solution parameters which are of integer types. As can be seen from FIG. 11, the tidal regression model consists of both continuous parameters 622, such as $\Delta A^{P1}_{m,d}$ of decimal type (its values are ranged from −2.5 to 7.5), and as $p_{m,d}$ is enumerated (integer) parameter, ranged from 8 to 17.

In the GA-based regression analysis program, the unified enumerated (integer) chromosomes 632 are adapted, in which range of each gene's value is from 0 to 400, such as the gene $g_1$ 630 in FIG. 11. A specially designed Gene Converter 628 is developed to convert the enumerated integer into the required parameter values 622, for example, to convert $g_1$ 630, which ranged from integer 0 to 400, to the integer values ranged from 8 to 17 for model parameter $p_{m,d}$ 608, (see 624, 626). The conversion is described in following equations:

$$V=\{8, 9, 10, 11, 12, 13, 14, 15, 16, 17\} \quad (11)$$

$$n=(g_1 \text{ MOD } 10)+1 \quad (12)$$

$$p_{m,d}=V[n] \quad (13)$$

Note that the modulus operator (MOD) yields the integer remainder from the division of two integer operands, e.g., for example, (13 MOD 10) evaluates to 3, and 15 MOD 5 evaluates to 0. Other model parameters are converted from the enumerated (integer) genes as follows:

$$R^{P1}_{m,d}=g_2/40 \quad (14)$$

$$\Delta A^{P1}_{m,d}=(g_3-100)/40 \quad (15)$$

$$s^{P1}_{m,d}=1.0+(g_4/10-20)/100 \quad (16)$$

$$v^{P1}_{m,d}=(g_5-200)/40 \quad (17)$$

The genes $g_6$, $g_7$, $g_8$, $g_9$ are converted to parameters $R^{P2}_{m,d}$, $\Delta A^{P2}_{m,d}$, $s^{P2}_{m,d}$, $v^{P2}_{m,d}$ for the second segment 420 of the tidal curve using the same method shown in Equation (14), (15), (16), and (17).

The least squares method is used in the GA-based tidal regression analysis program to evaluate the fitness of the regression model consolidated by the model parameters searched by the GA regression analyzer. The tidal data points observed on day d and month m, at time $t_k$ (k=1 to $N_t$) are denoted as $h_{m,d}(t_k)$ in form of $(h_1, t_1), (h_2, t_2), \ldots, (h_n, t_{Nt})$, where t is time, and h is the tidal height in meter. The fitting curve function $H_{m,d}(t_k)$ has the deviation (error) d from each data point, i.e., $d_1=h_{m,d}(t_1)-H_{m,d}(t_1)$, $d_2=h_{m,d}(t_2)-H_{m,d}(t_2)$, $d_3=h_{m,d}(t_3)-H_{m,d}(t_3)$, . . . , $d_{n=hm,d}(t_n)-H_{m,d}(t_{Nt})$. According to the method of least squares, the best fitting curve should minimize $F_{m,d}$ as shown in the following fitness function.

$$F_{m,d}=\sum_{k=1}^{N_t} d_k^2 = \sum_{k=1}^{N_t}[h_{m,d}(t_k)+H_{m,d}(t_k)]^2 \quad (18)$$

Figure 12:
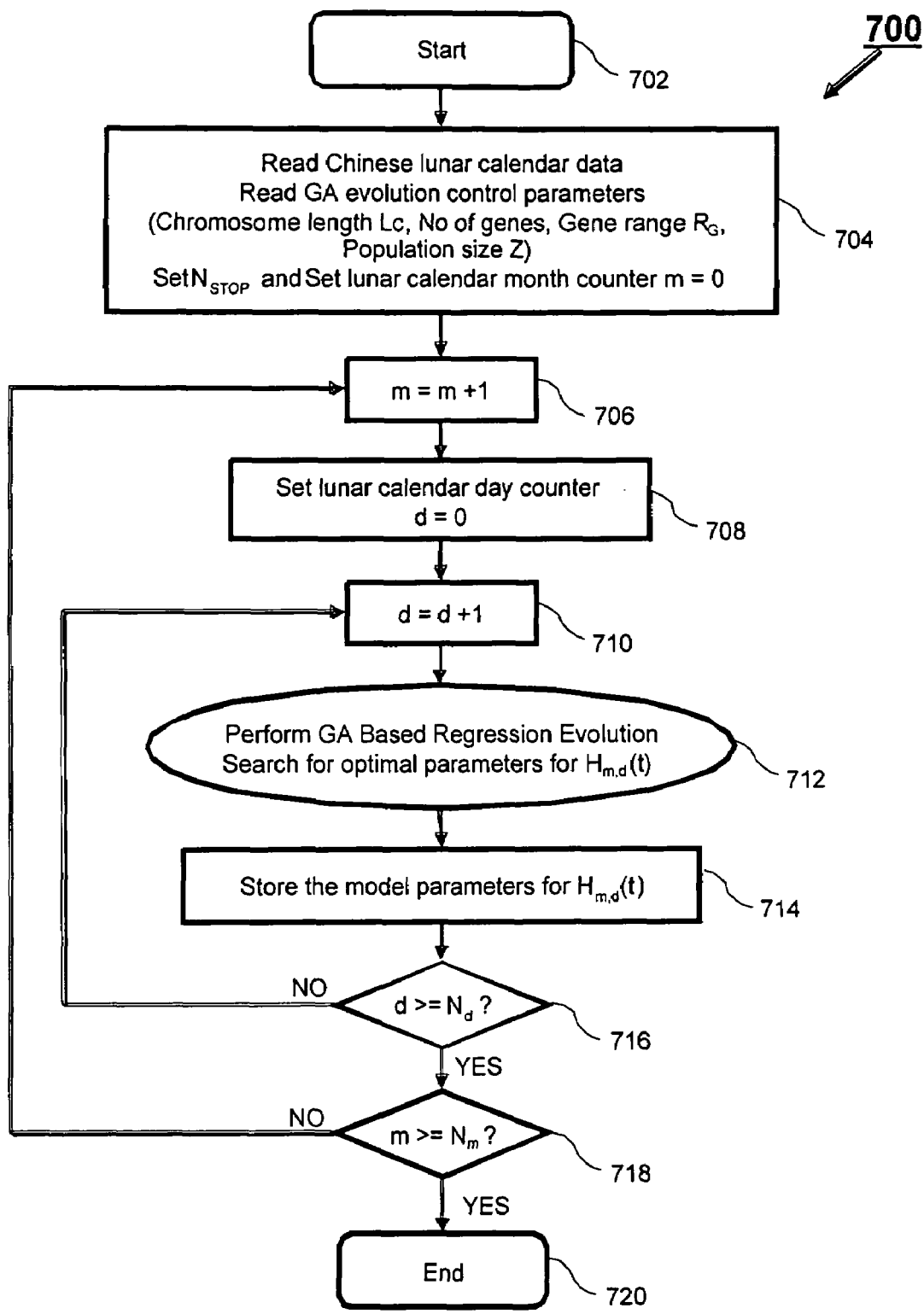
FIG. 12 is a general flowchart of a method for creating empirical tidal prediction model matrix $H_{M \times D}(t)$ using the Genetic Algorithms based regression analyzer.

Referring now to FIG. 12, a flowchart of a method 700 of generating empirical tidal prediction models using the genetic algorithms based regression analyzer program 40 is illustrated. The method 700 is a detailed description of the GA based analysis step 304 shown in FIG. 7. The method 700 starts at step 702 and proceeds to step 704 at which the GA regression analyzer reads into the computer memory the Chinese lunar calendar data, and evolution control parameters, such as chromosome length Lc, range of gene values, population size Z. The system then initializes the lunar calendar month counter to zero (m=0) for the lunar month count $N_m$, which is equal to 12 for a normal Chinese lunar calendar without the leap month added. The model parameter searching cycle count $N_{STOP}$ is predetermined by a user and can be any arbitrary number depending on the parameter searching requirements. In the preferred embodiment, $N_{STOP}$ is set for a value between fifty and one hundred. However, other ranges of values may also be set.

The method 700 continues at step 706 at which the month counter m is incremented by one and the method 700 then proceeds to step 708 at which the Lunar calendar day counter a is set to zero and then proceeds to step 710 at which the day counter d is incremented by one too. The curve-fitting or model parameter searching will be repeated until parameters for all models are determined.

The method 700 proceeds to step 712, which is a GA-based regression evolution module designed for searching for optimal parameters for the model $H_{m,d}(t)$. The optimal model parameters, as output of the regression evolution module 712, will be stored into storage medium 22b in FIG. 1 at step 714.

At decision step 716, the method 700 checks whether the model parameter searching has been completed for the lunar month m, e.g., $(d>=N_d?)$. For a "NO", the method 700 returns to step 710 to repeat the steps 712 and 714 for another cycle of model parameter searching. Otherwise, with a 'YES', the method proceeds to next decision step 718, at which the method 700 checks whether the model parameter searching has been fully completed for all lunar months in the reference year. Similarly, with a "NO", the method returns to step 706 to repeat steps 706, 708, 710, 712, 714, and 716 to perform another cycle of parameter searching for next lunar month. Otherwise, with a 'YES', the method 700 goes to step 720 to end the model parameter searching process.

Figure 13:
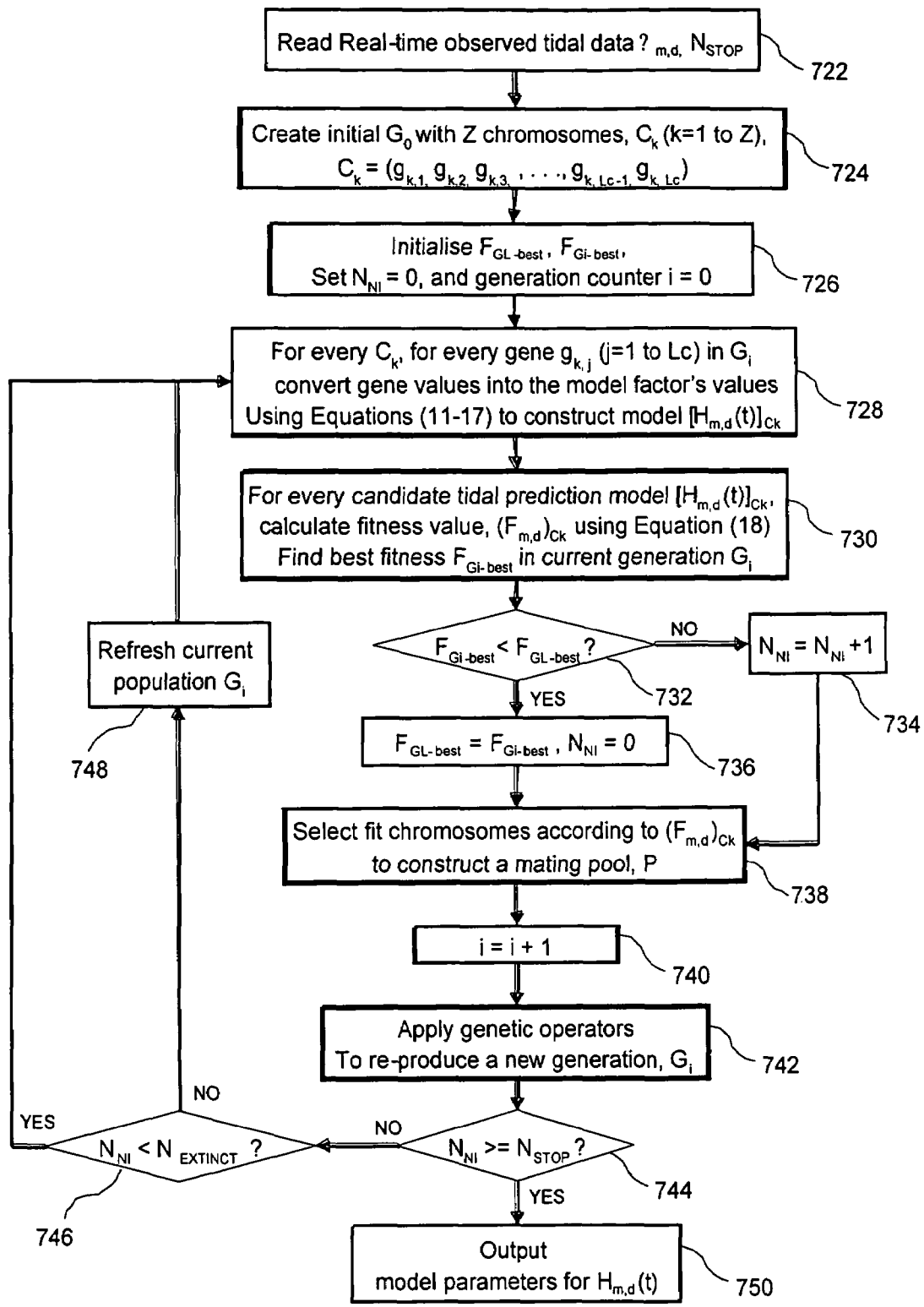
FIG. 13 is a detailed flowchart of the method of using Genetic Algorithms based multiple parameter regression analysis method to create tidal prediction model $H_{m,d}(t_k)$.

FIG. 13 is a flowchart illustrating details of the GA evolution module 712 in the method 700. At step 722, the GA searching engine reads into the memory the actual tidal data $\Omega_{m,d}$ and $N_{STOP}$. Thereafter, the GA parameter-searching engine creates an initial generation $G_0$ by randomly generating Z chromosomes at step 724. Each of the Z chromosomes, $C_k$, consists of Lc genes, (k=1 to Z). In other words, $$C_k=(g_{k,1}; g_{k,2}, g_{k,3}, \ldots, g_{k,Lc-1}, g_{k,Lc}) \quad (19)$$

The GA parameter searching module 712 then initializes a global best fitness variable, $F_{GL-best}$, and a best fitness variable for the $i^{th}$ generation, $F_{Gi-best}$ at step 726. Both $N_{NI}$ and i are set to zero, where $N_{NI}$ is a variable that represents the number of generations evolved without any overall fitness improvement; and i is the generation counter.

Unlike existing GA systems, the chromosome $C_k$ in the present invention does not directly represent solution parameters. The integer values of genes, $g_{k,1}; g_{k,2}, g_{k,3}, \ldots, g_{k,Lc-1}, g_{k,Lc}$ in the chromosome $C_k$ are converted into the regression model parameter's values using Equations (11 to 17) and the construct the prediction model $[H_{m,d}(t)]_{Ck}$ at step 728. Thereafter, The GA regression module 712 then evaluates each of the Z candidate tidal prediction models, $[H_{m,d}(t)]_{Ck}$ (k=1 to Lc) by calculating a fitness value $[F_{m,d}]_{Ck}$ using Equations (18) at step 730. The lower the fitness value, the better a regression model fits the observed tidal data. There must be a best fitness value $F_{Gi-best}$ in each generation $G_i$, the $F_{Gi-best}$ is determined at end of the step 730.

If $F_{Gi-best}$ is better than $F_{GL-best}$, at decision step 732, then the GA regression module 712 updates $F_{GL-best}$ by assigning $F_{Gi-best}$ as $F_{GL-best}$ at step 736 and setting $N_{NI}$=0. Otherwise if $F_{Gi-best}$ shows no improvement, then $N_{NI}$ is incremented by one at step 734. In any case, fit chromosomes are selected according to $[F_{m,d}]_{Ck}$ at step 738. Such fit chromosomes are used to construct a mating pool; and the number of evolutions (i) is incremented at step 740. From the mating pool, the GA system reproduces a new generation, $G_i$, at step 742 by applying crossover and mutation operators. At the reproducing step 742, the most-fit individuals in a current generation are copied directly to the new generation, $G_i$.

It is possible that during evolution, the GA based parameter-searching program becomes stagnant and unable to find more-fit model parameters even though an optimum fitness has not been attained. This is largely because the initial population of the individuals is randomly generated. When this situation occurs, the GA based regression model creator sets an extinction operator (NEXTINCT) to terminate the evolution. The extinction operator is like a biological extinction of a population that kills all but the most-fit individuals. The population is then refreshed with mutated copies of such most fit individuals. The model creator allows a user to specify GA evolution parameters 36 in FIG. 1, including a number of generations after which extinction occurs if there is no improvement in fitness after that number of generations.

The GA regression analyzing module 712 may stop the GA evolution if the overall fitness has no improvement after $N_{STOP}$ generations, e.g., $N_{NI} \geq N_{STOP}$ at decision step 744. Thereafter, with a 'Yes', the GA regression analyzing module 712 outputs the most fit prediction model $H_{m,d}(t)$ at step 750. Otherwise, with a 'No', the GA regression analyzing module checks at decision step 746 whether there is a need to use the extinction operator, $N_{EXTINCT}$. This decision step requires checking whether $N_{NI}$ is less than $N_{EXTINCT}$. With a 'No' following the decision step 746, the GA regression analysis module refreshes a current population in $G_i$ at step 748 and returns to step 728. Otherwise, with a 'Yes' following the decision step 746, the GA regression analysis module goes directly to step 728. This parameter searching evolution repeats until the stop condition 744 is met.

Figure 14:
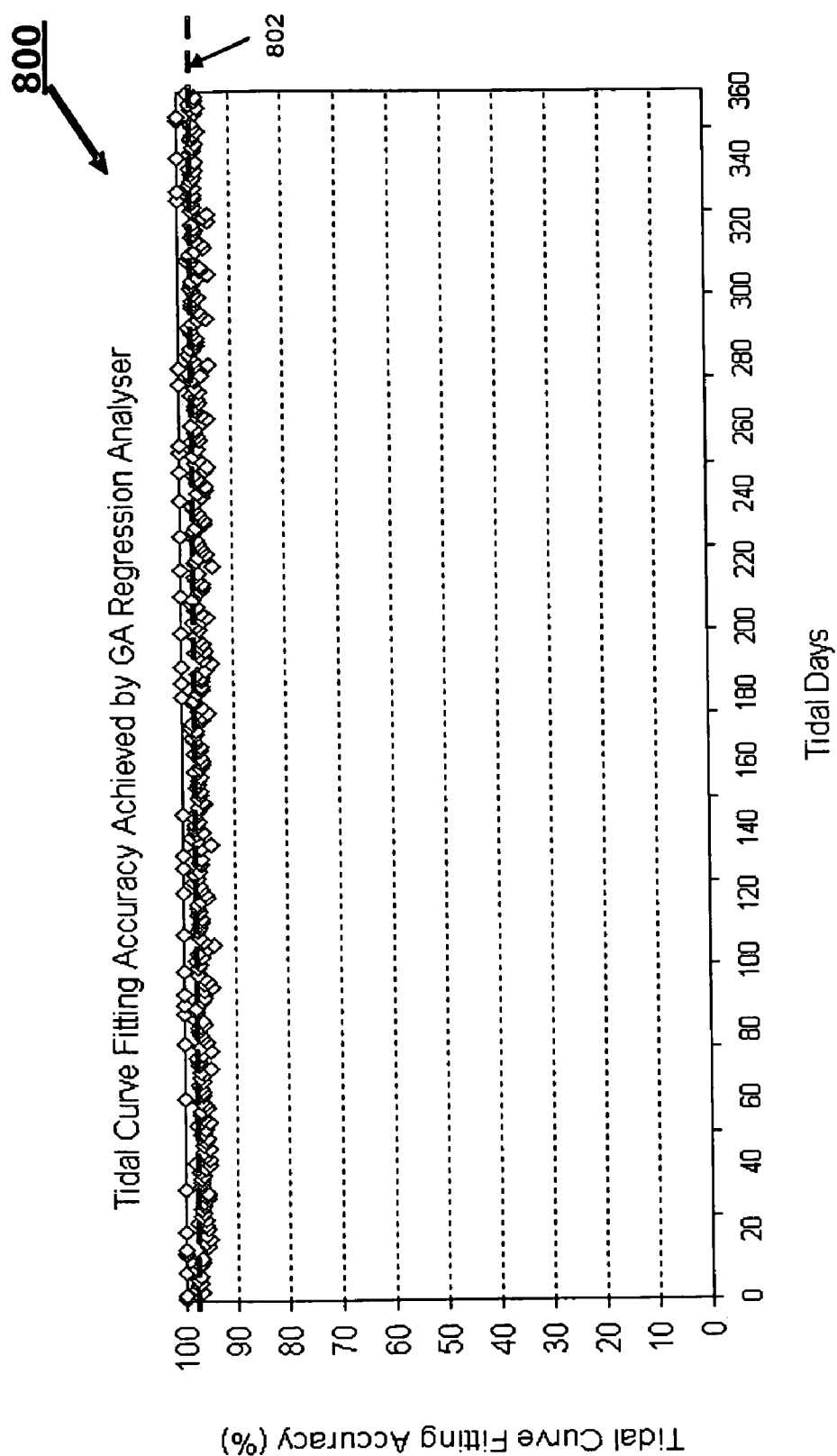
FIG. 14 shows the tidal curve-fitting accuracy achieved by the GA-based regression analyzer.

FIG. 14 is an exemplary chart showing tidal curve-fitting accuracy achieved by the GA based regression analysis for the tidal data collected in reference year 2003 (Chinese lunar year 4704) at a reference station. The curve-fitting accuracy is computed as follows:

$$\Psi_{m,d} = \frac{1}{N_t} \times \left( \sum_{k=1}^{N_t} \left(1 - \frac{abs[h_{m,d}(t_k) - H_{m,d}(t_k)]}{H_{m,d}(t_k)}\right) \times 100\% \right) \quad (20)$$

In Equation (20), $\Psi_{m,d}$ is the curve-fitting accuracy in terms of percentage; $N_t$ the number of observed tidal height readings taken during day d in lunar month m; $h_{m,d}(t_k)$ the observed tidal height in meters at time $t_k$, and $H_{m,d}(t_k)$ the predicted tidal height in meters at time $t_k$. The tidal curve-fitting accuracy $\Psi_{m,d}$ calculated using Equation (20) is relative accuracy in percentage for day d in lunar month m. As shown in FIG. 14, the average tidal curve-fitting accuracy 800 achieved in the whole reference year (4702) is 97%, as shown in a dotted line 802, which is sufficient enough for any real-time tidal prediction applications.

Figure 15:
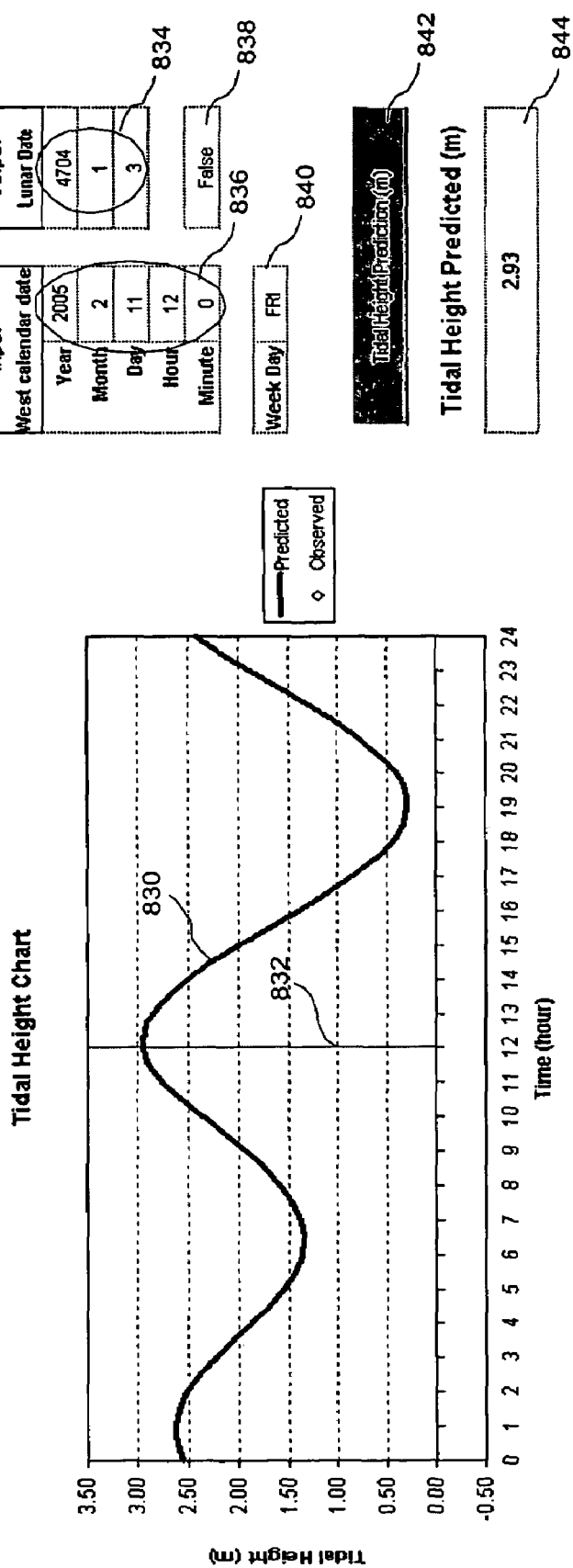
FIG. 15 illustrates an exemplary and simplified user interface of the Chinese calendar-based tidal prediction system.

FIG. 15 shows a simplified GUI for the Chinese lunar calendar based tidal prediction system 10. The user input data 836 including year, month and date in Gregorian calendar, as well as time (hour and minute) are given by the user. The command-bottom "Tidal Height Prediction" 842, if pressed, triggers the calendar converter program that is built into the system, to convert the date information in Gregorian calendar to the date 834 in Chinese lunar calendar, and whether the converted lunar month is a leap month (True or False) 838 is indicated, and week day is also displayed 840. The predicted tidal curve 830 is drawn, and tidal height at a specific time (12:00 am shown in FIG. 15) is displayed 844. A cursor, e.g., a vertical line 832, can be moved along the predicted tidal curve, towards either left or right to read the predicted tidal heights at a time interval of one minute, five minutes or thirty minutes, depending upon the user's choice, within the tidal day from 00:00 to 24:00, where time 24:00 is 00:00 am on next day.

Very often, the prediction lunar year $Y_p$ may be a leap year during which a leap month, $m_p$, is added (actually 7 times in every 19 year cycle). The leap month $m_p$ can be any month from $2^{nd}$ to $11^{th}$ lunar month in the Chinese lunar calendar system. For example, in FIG. 3, the second $4^{th}$ month 76 is a leap month, e.g., the $4^{th}$ month appears twice in Chinese lunar year 4700 (Gregorian calendar year 2001). On the other hand, there are only 12 months in the reference year $Y_R$ as shown in FIG. 10 (where $N_m$=12). It is not justifiable to use the models associated with $m_R$ (R=4) to predict the tides for the leap month $m_p$ (p=4). Therefore, following composite model is proposed.

$$H_{lp,d}(t_k) = \frac{1}{2}[H_{m,d}(t_k) + H_{m+1,d}(t_k)] \quad (21)$$

In Equation (21), the prediction model for the leap month is denoted as $H_{lp,d}(t_k)$, the index lp stands for leap month, where lp=m. The Equation (21) takes mean value of the previous month's and next month's models to generate the tidal prediction for the leap month. Real tidal observation data approve of Equation (21).

Although the empirical tidal prediction models are generated by the GA-based regression analysis for the actual tidal observations collected at one water station, say Station$_R$, the prediction system can also be used to predict tidal heights for other nearby water stations, say, Station$_P$. In this case, two new factors need to be introduced. One is the high tide arrival time adjusting factor $\Delta T_A$ and another one is tidal height amplitude adjusting factor $\Delta R_H$.

The time adjusting factor $\Delta T_A$ is used in the system to adjust the high tide arrival time at Station$_P$. Note that the angular distance between Station$_R$ and Station$_P$ in terms of their longitude can be used as reference to calculate the value of the factor $\Delta T_A$; and that longitude angular distance 15° is equivalent to one hour of time. The tidal height amplitude adjusting factor $\Delta R_H$ basically depends upon latitude of the station. In general, the range of the tides gets larger the further the location from the equator. However, the tidal range of a particular station depends very much on a lot of non-astronomical factors, such as the configuration of the coastline which has significant influence on the range of the tides. Therefore, it is desirable to take actual tidal measurements to computer an average value for the factor $\Delta R_H$ and then the system will combine the factor $\Delta R_H$ and the amplitude factor $R^{P2}_{m,d}$ in Equation (7) to predict the tidal heights.

If, however, the angular distance, either in latitude or in longitude, between $Station_R$ and $Station_P$ become considerably large, say, more than 15 degrees, or even more importantly, non-astronomical factors at $Station_p$ are so much different from $Station_R$, it may be more desirable to collect one new set of actual tidal data at $Station_p$, based upon which a set of prediction models can be created using the GA based analyzer for tidal prediction.

Figure 16:
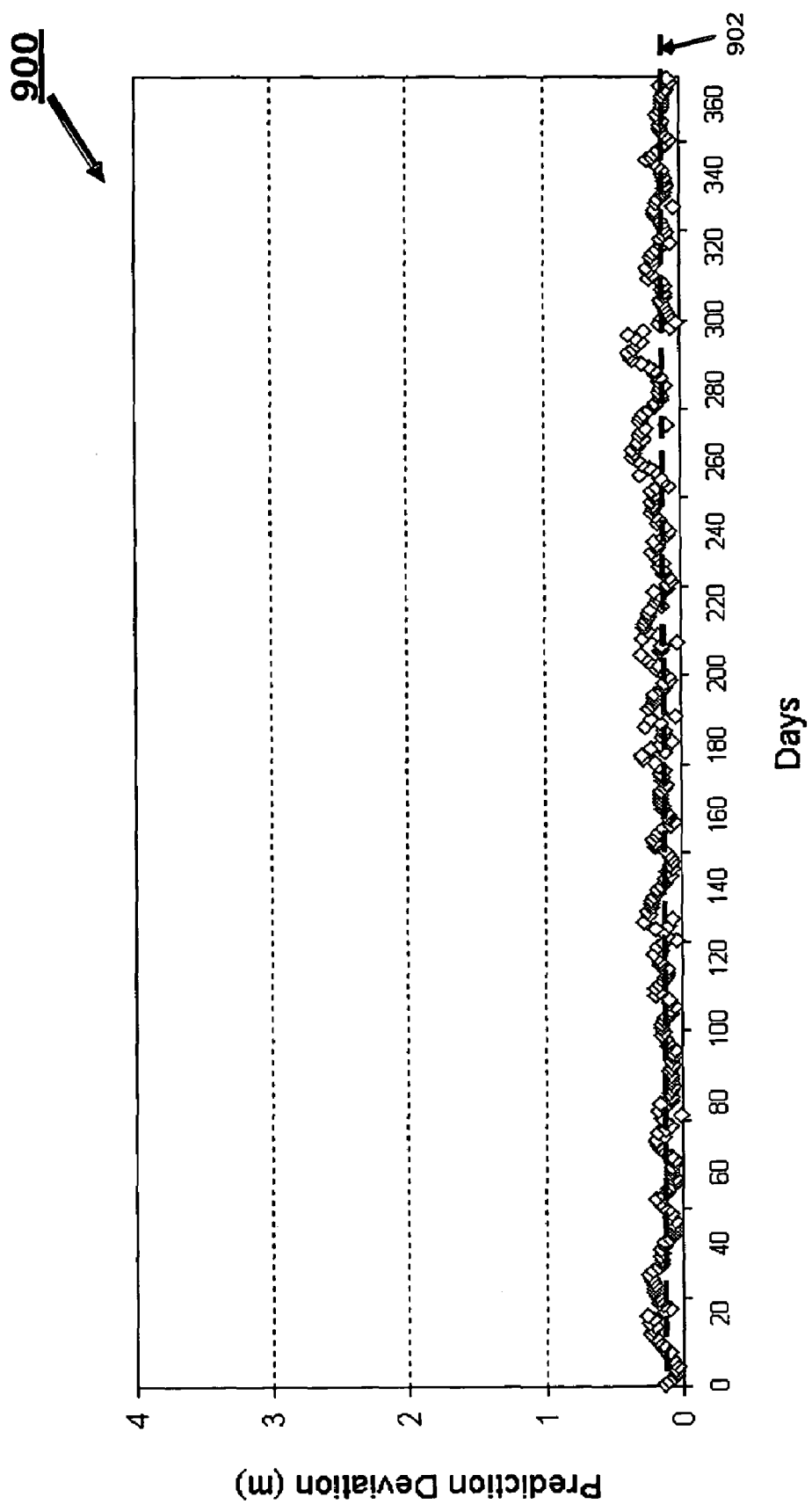
FIG. 16 shows the tidal prediction accuracy achieved by the Chinese lunar calendar-based tidal prediction system of FIG. 1.

FIG. 16 shows tidal prediction accuracy 900 achieved by the tidal prediction system for prediction year 2004. The data shown in FIG. 16 is the average difference between the predicted and actual tidal heights collected in the prediction year (2004). For each tidal day, the difference between the predicted and actual observed tidal heights, $\Delta H_{m,d}$, is computed as follows:

$$\Delta H_{m,d} = \frac{1}{N_t} \sum_{k}^{N_t} \text{abs}[h_{m,d}(t_k) - H_{m,d}(t_k)] \quad (22)$$

As shown in FIG. 16, the mean average difference 902 between the predicted and actual observed tidal heights is 0.15 meter. The average prediction accuracy in percentage is around 90%, which is sufficient for practical tidal prediction applications.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A tidal prediction system based upon Chinese lunar calendar, said tidal prediction system comprising:
   a user interface; and
   an electronic device having a memory capacity and processing capacity;
   wherein the user interface electronically connected to the electronic device so that a user of said tidal prediction system may input any information into the electronic device and the electronic device can store and process the input information; and
   wherein the electronic device is embedded with executable computing programs that generate tidal predictions using the input information from the user; the executable computing programs including a Genetic Algorithms (GA)-based regression model creator program for using prediction model parameters to create a regression tidal prediction model, and a tidal height predictor program utilizing Chinese lunar calendar making tidal predictions on the basis of the regression tidal prediction model, wherein said user interface provides said generated tidal predictions for use by the user.

2. The tidal prediction system of claim 1, wherein the user interface and the electronic device is connected via cable or wireless.

3. The tidal prediction system of claim 1, wherein the electronic device may be any computing device including PCs, notebooks, PDAs, and computers.

4. The tidal prediction system of claim 1, wherein the GA-based regression model creator program further comprises a model parameter editor program by which a user of said tidal prediction system can manually edit the prediction model parameters used for generating the regression model.

5. The tidal prediction system of claim 1, wherein the executable computing programs further comprises a virtual addition program for adding a virtual day to any Chinese lunar month with 29 days and providing tidal data for the virtual day so that a regression prediction model for the virtual day can be generated.

6. The tidal prediction system of claim 1, wherein the executable computing programs further comprises a month adjust program for providing a month adjust factor so that a prediction date can be better matched with a reference date according to Chinese lunar calendar.

7. The tidal prediction system of claim 1, wherein the tidal height predictor program further comprises a calendar converter program and a tidal predictor program;
   wherein the calendar converter program is capable of conversion of dates between a Chinese lunar calendar date and a Gregorian date, and the tidal predictor program uses the regression prediction model of the proper reference Chinese lunar calendar date to make tidal predictions for the predicting Chinese lunar calendar.

8. The tidal prediction system of claim 7, wherein the tidal height predictor program further comprises a prediction analyzer program comparing the predicted tidal data with available actual tidal data to determine the prediction accuracy.

9. The tidal prediction system of claim 1, wherein the GA-based regression model creator program further comprises a GA-based regression analyzer program;
   wherein the GA-based regression model creator program retrieves observed tidal data for a reference year, model design parameters, and GA evolution control parameters; and
   performs GA evolution cycles to search for optimal regression parameters that best fit the observed tidal data, thereby the optimal regression parameters will be used as the prediction model parameters for generating the regression model.

10. The tidal prediction system of claim 9, wherein the reference year is either a Chinese lunar calendar or a Gregorian calendar year during which the observed tidal data is collected.

11. The tidal prediction system of claim 9, wherein the regression model has the following equation:

$$H_{m,d}(t_k) = \begin{cases} x_{m,d}^{P_1} + R_{m,d}^{P_1} \times \cos\left[(4\pi + \Delta A_{m,d}^{P_1}) - a_{m,d}^{P_1} \times s_{m,d}^{P_1} \times t_k\right] + v_{m,d}^{P_1} & (0 \leq t_k \leq p_{m,d}) \\ x_{m,d}^{P_2} + R_{m,d}^{P_2} \times \cos\left[(4\pi + \Delta A_{m,d}^{P_2}) - a_{m,d}^{P_2} \times s_{m,d}^{P_2} \times t_k\right] + v_{m,d}^{P_2} & (p_{m,d} < t_k \leq 24) \end{cases}$$

where the tidal fitting-curve modeled by the Equation is divided at point $p_{m,d}$ into two segments: segment$_1$ with period $p_1$ ($0 \leq t_k \geq p_{m,d}$) and segment$_2$ with period $p_2$ ($p_{m,d} \leq t_k \geq 24$); where $H_{m,d}(t_k)$ is the tidal height prediction function in which $t_k$ is time, m is the lunar month index, and d is tidal day index; where $x^{P_1}_{m,d}$ is the mean value of the tidal heights during period $p_1$, $R^{P_1}_{m,d}$ is an amplitude factor in period $p_1$, $\Delta A^{P_1}_{m,d}$ is phase adjustment factor in period $p_1$, and $a^{P_1}_{m,d}$ is the angular adjustment factor in period $p_1$, $s^{P_1}_{m,d}$ is tidal curve stretch factor in period $p_1$, and $v^{P_1}_{m,d}$ is a micro-tidal height adjustment factor in period $p_1$; and where $x^{P_2}_{m,d}$ is the mean value of the tidal heights during period $p_2$, $R^{P_2}_{m,d}$ is an amplitude factor in period $p_2$, $\Delta A^{P_2}_{m,d}$ is phase adjustment factor in period $p_2$, and $a^{P_2}_{m,d}$ is the angular adjustment factor in period $p_2$, $s^{P_2}_{m,d}$ is tidal curve stretch factor in period $p_2$, and $v^{P_2}_{m,d}$ is a micro-tidal height adjustment factor in period $p_2$.

12. The tidal prediction system of claim 11, wherein the $x^{P_1}_{m,d}$ can be calculated as follows:

$$x^{P_1}_{m,d} = \frac{1}{N_{P_1}} \sum_{t_k=0}^{N_{P_1}} H^{P_1}_{m,d}(t_k)$$

wherein the $x^{P_2}_{m,d}$ can be calculated as follows:

$$x^{P_2}_{m,d} = \frac{1}{N_{P_2}} \sum_{t_k=N_{P_2}}^{24} H^{P_2}_{m,d}(t_k)$$

wherein the $a^{P_1}_{m,d}$ can be computed as follows:

$$a^{P_1}_{m,d} = \frac{4\pi}{N_H \times 60}$$

and wherein other parameters in the equation of the regression model is obtained by the GA-based regression analyzer program through general GA operations.

13. A Chinese lunar calendar-based tidal prediction method comprising:

inputting a prediction date of which the tidal prediction is requested for a location;

selecting a reference year from which the tidal prediction for the prediction date will be made;

obtaining actual tidal data in the reference year near the location, wherein the actual tidal data is formatted according to Chinese lunar calendar;

generating a regression prediction model for the actual tidal data of the reference year by performing genetic algorithm evolution of the actual tidal data;

predicting the tidal heights for the requested prediction date in accordance with the regression prediction model; and, providing said predicted tidal heights to the user.

14. The method of claim 13, wherein, in the step of obtaining actual tidal data, if the requested prediction date is the 30$^{th}$ day of the lunar month and the reference lunar month has only 29 days, a virtual day will be added to the reference month, and proper tidal data will be created to generate the regression prediction model for the virtual day.

15. The method of claim 13, wherein, in the step of obtaining actual tidal data, the actual tidal data may be inputted by the user for performing the prediction or collected and stored to be used for performing the predictions.

16. The method of claim 13, wherein, in the step of predicting the tidal heights, a month adjust factor is applied if the start day of the month of the prediction date is too further away from the reference month, and thereafter determining the correct lunar month in the reference year for retrieving a correct regression prediction model.

17. The method of claim 13, wherein, in the step of generating the regression prediction model, it converts chromosomes from fixed range of integer numbers into tidal prediction model parameters.

18. The method of claim 17, wherein, in the step of generating the regression prediction model, it further calculates fitness value for each of regression prediction models.

19. The method of claim 13, wherein the regression prediction model has the following equation:

$$H_{m,d}(t_k) = \begin{cases} x_{m,d}^{P_1} + R_{m,d}^{P_1} \times \cos\left[(4\pi + \Delta A_{m,d}^{P_1}) - a_{m,d}^{P_1} \times s_{m,d}^{P_1} \times t_k\right] + v_{m,d}^{P_1} & (0 \leq t_k \leq p_{m,d}) \\ x_{m,d}^{P_2} + R_{m,d}^{P_2} \times \cos\left[(4\pi + \Delta A_{m,d}^{P_2}) - a_{m,d}^{P_2} \times s_{m,d}^{P_2} \times t_k\right] + v_{m,d}^{P_2} & (p_{m,d} < t_k \leq 24) \end{cases}$$

where the tidal fitting-curve modeled by the Equation is divided at point $p_{m,d}$ into two segments: segment$_1$ with period $p_1$ ($0 \leq t_k \geq p_{m,d}$) and segment$_2$ with period $p_2$ ($p_{m,d} \leq t_k \geq 24$); where $H_{m,d}(t_k)$ is the tidal height prediction function in which $t_k$ is time, m is the lunar month index, and d is tidal day index; where $x^{P_1}_{m,d}$ is the mean value of the tidal heights during period $p_1$, $R^{P_1}_{m,d}$ is an amplitude factor in period $p_1$, $\Delta A^{P_1}_{m,d}$ is phase adjustment factor in period $p_1$, and $a^{P1}_{m,d}$ is the angular adjustment factor in period $p_1$, $s^{P1}_{m,d}$ is tidal curve stretch factor in period $p_1$, and $v^{P1}_{m,d}$ is a micro-tidal height adjustment factor in period $p_1$; and where $x^{P2}_{m,d}$ is the mean value of the tidal heights during period $p_2$, $R^{P2}_{m,d}$ is an amplitude factor in period $p_2$, $\Delta A^{P2}_{m,d}$ is phase adjustment factor in period $p_2$, and $a^{P2}_{m,d}$ is the angular adjustment factor in period $p_2$, $s^{P2}_{m,d}$ is tidal curve stretch factor in period $p_2$, and $v^{P2}_{m,d}$ is a micro-tidal height adjustment factor in period $p_2$.

20. The method of claim 19, wherein the $x^{P1}_{m,d}$ can be calculated as follows:

$$x^{P1}_{m,d} = \frac{1}{N_{P_1}} \sum_{t_k=0}^{N_{P_1}} H^{P1}_{m,d}(t_k)$$

wherein the $x^{P2}_{m,d}$ can be calculated as follows:

$$x^{P2}_{m,d} = \frac{1}{N_{P_2}} \sum_{t_k=N_{P_2}}^{24} H^{P2}_{m,d}(t_k)$$

wherein the $a^{P1}_{m,d}$ can be computed as follows:

$$a^{P1}_{m,d} = \frac{4\pi}{N_H \times 60}$$

and wherein other parameters in the equation of the regression model is obtained by the GA-based regression analyzer program through general GA operations.

* * * * *